(12) United States Patent
Schwartz

(10) Patent No.: US 9,483,704 B2
(45) Date of Patent: Nov. 1, 2016

(54) REALOGRAM SCENE ANALYSIS OF IMAGES: SUPERPIXEL SCENE ANALYSIS

(71) Applicant: Edward Schwartz, Menlo Park, CA (US)

(72) Inventor: Edward Schwartz, Menlo Park, CA (US)

(73) Assignee: RICOH CO., LTD., Tokyo (JP)

(*) Notice: Subject to any disclaimer, the term of this patent is extended or adjusted under 35 U.S.C. 154(b) by 41 days.

(21) Appl. No.: 14/641,290

(22) Filed: Mar. 6, 2015

(65) Prior Publication Data

US 2016/0171707 A1    Jun. 16, 2016

Related U.S. Application Data

(60) Provisional application No. 62/090,177, filed on Dec. 10, 2014.

(51) Int. Cl.

| G06T 7/00  | (2006.01) |
|---|---|
| G06K 9/46  | (2006.01) |
| G06K 9/62  | (2006.01) |
| G06K 9/52  | (2006.01) |
| G06K 9/18  | (2006.01) |
| G06Q 10/08 | (2012.01) |
| G06T 7/40  | (2006.01) |
| G06K 9/00  | (2006.01) |

(52) U.S. Cl.
CPC ............. *G06K 9/46* (2013.01); *G06K 9/00201* (2013.01); *G06K 9/18* (2013.01); *G06K 9/52* (2013.01); *G06K 9/6201* (2013.01); *G06K 9/6218* (2013.01); *G06K 9/6267* (2013.01); *G06Q 10/087* (2013.01); *G06T 7/0042* (2013.01); *G06T 7/0079* (2013.01); *G06T 7/0081* (2013.01); *G06T 7/408* (2013.01); *G06K 2009/4666* (2013.01); *G06T 2207/10004* (2013.01)

(58) Field of Classification Search
None
See application file for complete search history.

(56) References Cited

U.S. PATENT DOCUMENTS

| 7,596,275 | B1* | 9/2009 | Richardson | G01V 5/0016 250/358.1 |
|---|---|---|---|---|
| 8,189,855 | B2* | 5/2012 | Opalach | G06Q 10/087 382/100 |
| 2008/0077511 | A1* | 3/2008 | Zimmerman | G06Q 10/00 705/28 |
| 2014/0119656 | A1* | 5/2014 | Lilje | G06T 7/0083 382/173 |
| 2014/0232826 | A1* | 8/2014 | Halata | G06T 7/004 348/46 |

FOREIGN PATENT DOCUMENTS

| EP | 2375365 | 10/2011 |
|---|---|---|
| EP | 2722810 | 4/2014 |
| WO | WO2009027839 | 3/2009 |

OTHER PUBLICATIONS

European Search Report for EP 15197198.3, dated May 3, 2016, 9 pages.
European Search Report for EP 15197200.7, dated May 3, 2016, 8 pages.

(Continued)

*Primary Examiner* — Bernard Krasnic
(74) *Attorney, Agent, or Firm* — Patent Law Works LLP

(57) ABSTRACT

The techniques include an image recognition system to receive a realogram image including a plurality of organized objects and to detect and identify objects in the realogram image of one or more items on a retail shelf, identify shelf fronts and labels on the shelf fronts, identify empty space under shelves, identify areas where unidentified products may be, and identify areas where products are "out of stock".

17 Claims, 25 Drawing Sheets

(56) References Cited

OTHER PUBLICATIONS

European Search Report for EP 15198201.4, dated May 3, 2016, 11 pages.
David G. Lowe, "Object Recognition from Local Scale-Invariant Features", dated Jan. 1, 1999, 8 pages, Computer Science Department University of British Columbia, Cancouver, B.C.
David G. Lowe, "Distinctive Image Features From Scale-Invariant Keypoints", dated Jan. 5, 2004, 28 pages, Computer Science Department University of British Columbia Vancouver, B.C.
Alvaro Collet et al. "Object Recognition and Full Pose Registration from a Single Image for Robotic Manipulation", dated May 17, 2009, 8 pages, 2009 IEEE International Conference on Robotic and Automation.
Stephen Gould et al. "Region-Based Segmentation and Object Detection", dated Jul. 12, 2009, 9 pages, Department of Electrical Engineering, Stanford University.
Brian Fulkerson et al. "Class Segmentation and Object Localization with Superpixel Neighborhoods", dated Sep. 29, 2009, 8 pages, Department of Computer Science, University of California, Los Angeles, CA.
Xin Zhang et al. "Object Class Detection; A Survey", dated Oct. 1, 2013, 53 pages.
Anonymous "Multiple (Same) Object Recognition with OpenCv", dated Nov. 14, 2014, 2 pages.

* cited by examiner pair of superpixels    quantized gradient at boundary pixels

| gradient | count | x | y |
|---|---|---|---|
| | 0 | | |
| | 2 | x | y |
| | 0 | | |
| | 0 | | |
| | 0 | | |
| | 0 | | |
| | 0 | | |
| | 0 | | |
| | 1 | x | y |
| | 6 | x | y |

| top bin, bottom bin | width (bins) | number of labels | score | color (1..5 index) | luminance | from facings |
|---|---|---|---|---|---|---|
| 31,39 | 6 | 7 | 77 | 2 | 230 | yes |
| 32,38 | 6 | 7 | 131 | 2 | 230 | no |
| 32,39 | 7 | 7 | 150 | 2 | 230 | no |
| 33,38 | 5 | 7 | 114 | 2 | 230 | no |
| 38,44 | 6 | 1 | 40 | 1 | 168 | yes |
| 38,45 | 7 | 1 | 55 | 1 | 168 | yes |
| 80,86 | 6 | 11 | 77 | 2 | 230 | no |
| 81,87 | 6 | 11 | 131 | 2 | 230 | no |
| 81,88 | 7 | 11 | 150 | 2 | 230 | no |
| 82,87 | 5 | 11 | 114 | 2 | 230 | no |
| 121,138 | 17 | 6 | 50 | 1 | 168 | yes |
| 121,139 | 18 | 6 | 52 | 1 | 168 | yes |
| 122,139 | 7 | 6 | 55 | 1 | 168 | no |
| 122,130 | 8 | 6 | 40 | 1 | 168 | no |
| 123,129 | 6 | 6 | 43 | 1 | 168 | no |
| 150,168 | 18 | 7 | 52 | 1 | 168 | no |
| 151,168 | 17 | 7 | 50 | 1 | 168 | no |
| 156,168 | 8 | 6 | 40 | 1 | 168 | yes |
| 157,164 | 7 | 6 | 55 | 1 | 168 | yes |
| 160,166 | 8 | 7 | 77 | 2 | 230 | no |
| 161,167 | 6 | 7 | 131 | 2 | 230 | no |
| 161,168 | 7 | 7 | 150 | 2 | 230 | no |
| 162,167 | 5 | 7 | 114 | 2 | 230 | no |

Figure 26

REALOGRAM SCENE ANALYSIS OF IMAGES: SUPERPIXEL SCENE ANALYSIS

CROSS REFERENCE TO RELATED APPLICATIONS

The present application claims priority, under 35 U.S.C. §119, of U.S. Provisional Patent Application No. 62/090,177, filed Dec. 10, 2014 and entitled "Superpixel Based Realogram Scene Analysis," which is incorporated by reference in its entirety.

BACKGROUND

Field of the Art

The present specification generally relates to the field of object detection in image processing. More specifically, the present specification relates to a system and method for analyzing images of a plurality of organized objects to identify objects, shelf fronts and labels on the shelf fronts, empty space under shelves, areas where unidentified objects may be, and vacant areas in the image.

SUMMARY

The techniques include an image recognition system to receive an image of a plurality of organized objects. The image recognition system generates image segments (for example, superpixels) based on groups of pixels in the image of the plurality of organized objects and labels the image segments with information and observations from image analysis on the image of the plurality of organized objects. Further, the system classifies regions of the image of the plurality of organized objects based on the image segments. Regions may include, for example, an identified object in the image, shelf fronts and labels, empty space under shelves, areas where unidentified objects may be, and areas where products are "out of stock".

Other embodiments include corresponding methods and computer program products for recognizing objects in an image. The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques described herein are illustrated by way of example, and not by way of limitation, in the figures of the accompanying drawings in which like reference numerals are used to refer to similar elements.

FIG. 26 depicts an example of shelf hypotheses in a table.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Figure 1:
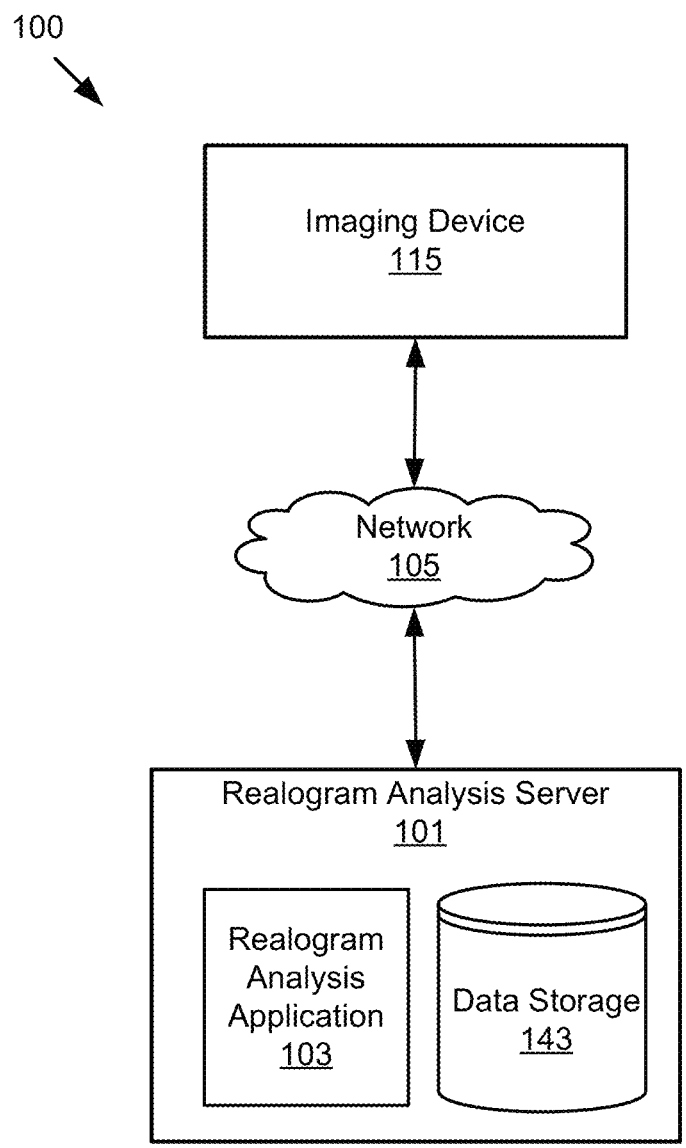
FIG. 1 is a high-level block diagram illustrating one example embodiment of a system 100 for analyzing images of a retail shelf.

FIG. 1 is a high-level block diagram illustrating one example embodiment of a system 100 for analyzing images of a retail shelf. The illustrated system 100 includes imaging device 115 and a realogram analysis server 101. In the illustrated embodiment, the entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (for example, the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data, including via short messaging service (SMS), multimedia messaging service (MMS), hypertext transfer protocol (HTTP), direct data connection, WAP, email, etc. Although FIG. 1 illustrates one network 105 coupled to the imaging device 115 and the realogram analysis server 101, in practice one or more networks can be connected to these entities.

In the illustrated embodiment, the system 100 includes a realogram analysis server 101 coupled to the network 105. The realogram analysis server 101 may be a computing device including a processor, a memory, network communication capabilities, and data storage (for example, data storage 143). In the example of FIG. 1, the components of the realogram analysis server 101 are configured to implement a realogram analysis application 103 described in more detail below. The realogram analysis server 101 may receive one or more images for analysis from the imaging device 115 or from another source, for example, uploaded via an internet browser, email, or the like. While the example of FIG. 1 includes one realogram analysis server 101, the system 100 may include one or more realogram analysis servers 101.

The data storage 143 is a non-transitory memory that stores data for providing the functionality described herein. The data storage 143 may be a dynamic random access memory (DRAM) device, a static random access memory (SRAM) device, flash memory or some other memory devices. In some embodiments, the data storage 143 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In one embodiment, the data storage 143 stores the images received by the realogram analysis server 101 and data associated with the images for access by users of the realogram analysis service. For example, data storage 143 may store image analysis results along with the received images and may be accessed via network 105. While the example of FIG. 1 includes a single data storage 143 as part of the realogram analysis server 101, it should be understood that data storage may be located elsewhere in the system 100. For example, a discrete storage device may be coupled with the realogram analysis server 101, via a local connection or over the network 105.

In one embodiment, the realogram analysis application 103 includes software and/or logic to detect and identify objects in an image of one or more items on a retail shelf, identify shelf fronts and labels on the shelf fronts, identify empty space under shelves, identify areas where unidentified products may be, and identify empty shelf spaces (for example, areas where products are "out of stock"). In some embodiments, the realogram analysis application 103 can be implemented using a combination of hardware and software as described herein.

The imaging device 115 depicted in FIG. 1 is used by way of example. In some embodiments, the imaging device 115 may be a computing device that includes a memory, a processor and a camera, for example a laptop computer, a tablet computer, a mobile telephone, a personal digital assistant (PDA), a mobile email device, a webcam or the like. In other embodiments, the image capture device may be a digital camera, or the like. While FIG. 1 illustrates a single image capture device 115, the disclosure applies to a system architecture having one or more image capture devices 115.

Figure 2:
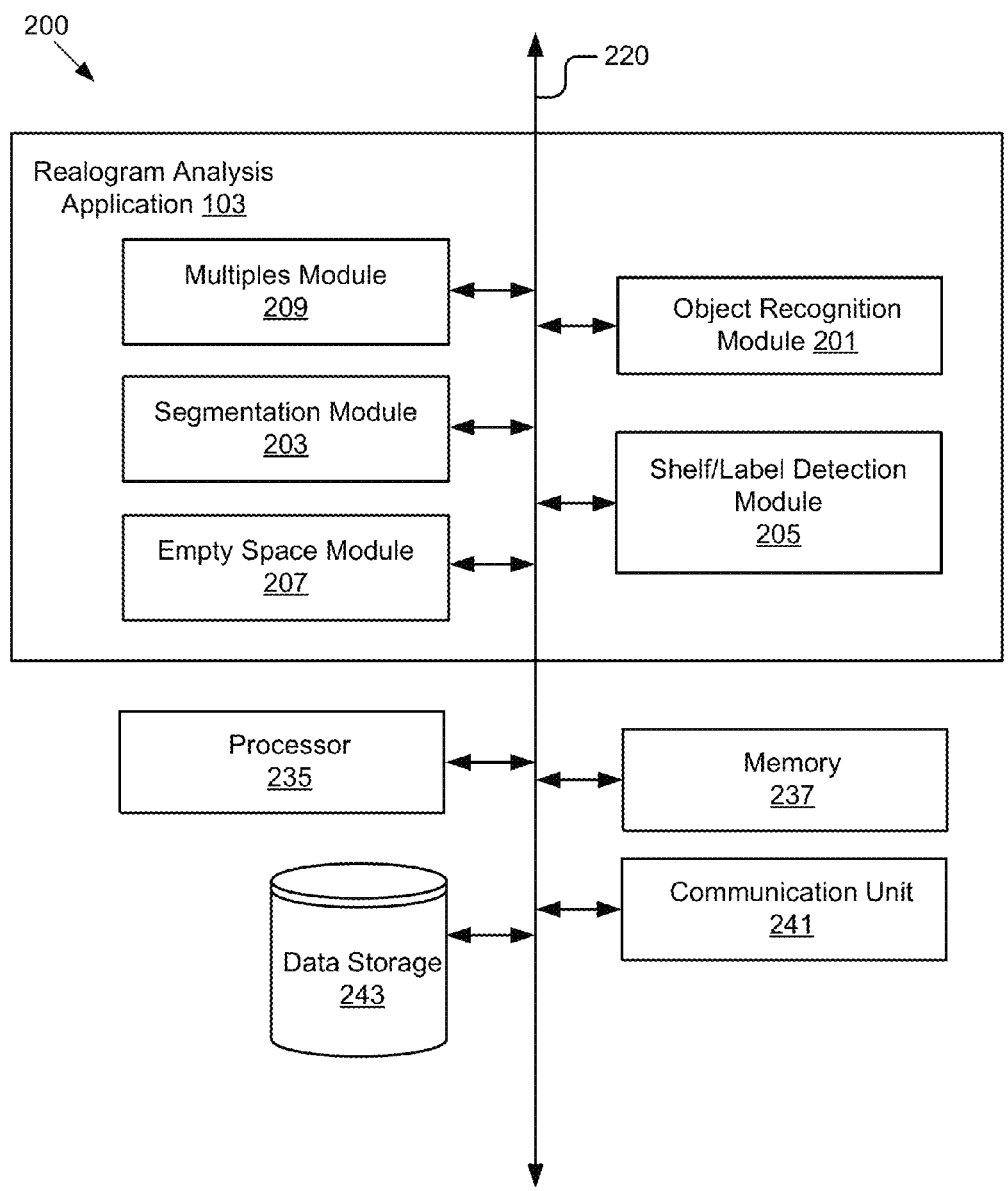
FIG. 2 illustrates a block diagram of an example realogram analysis system including a realogram analysis application.

FIG. 2 illustrates a block diagram of an example realogram analysis system 200 including a realogram analysis application 103. For example, the realogram analysis system 200 may be a realogram analysis server 101, as described above. In the example of FIG. 2, the realogram analysis system 200 includes a realogram analysis application 103, a processor 235, a memory 237, a communication unit 241, and data storage 243. The realogram analysis application 103 includes an object recognition module 201, a segmentation module 203, a shelf/label detection module 205, an empty space module 207, and a multiples module 209. In one embodiment, a bus 220 communicatively couples the components of the realogram analysis system 200. The bus 220 may represent one or more buses including an industry standard architecture (ISA) bus, a peripheral component interconnect (PCI) bus, a universal serial bus (USB), or some other bus known in the art to provide similar functionality.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, a Graphics Processing Unit (GPU), and/or an architecture implementing a combination of instruction sets. The processor 235 may include a single processing unit or a plurality of processing units and/or cores. In some embodiments, the processor 235 may be capable of generating and providing electronic display signals to a display device, supporting the display of images, capturing and transmitting images, performing complex tasks including various types of feature extraction and sampling, etc. In some embodiments, the processor 235 may be coupled to the memory 237 via the bus 220 to access data and instructions therefrom and store data therein. The bus 220 may couple the processor 235 to the other components of the realogram analysis system 200 including, for example, the object recognition module 201, the segmentation module 203, the shelf/label detection module 205, the empty space module 207, the multiples module 209, the memory 237, the communication unit 241, and the data storage 243. It will be apparent that other processors, sensors, displays and physical configurations are possible.

The memory 237 may store and provide access to data for the other components of the realogram analysis system 200. The memory 237 may be included in a single computing device or a plurality of computing devices as discussed elsewhere herein. In some embodiments, the memory 237 may store instructions and/or data that may be executed by the processor 235. For example, in one embodiment, the memory 237 may store instructions, which when executed by the processor, causes the processor to implement the realogram analysis application 103, including the object recognition module 201, the segmentation module 203, the shelf/label detection module 205, the empty space module 207, and the multiples module 209. The memory 237 may also be capable of storing other instructions and data, including, for example, an operating system, hardware drivers, other software applications, databases, etc. The memory 237 may be coupled to the bus 220 for communication with the processor 235 and the other components of the realogram analysis system 200.

The memory 237 may include one or more non-transitory computer-usable (for example, readable, writeable, etc.) mediums, which can be any tangible apparatus or device that can contain or store instructions, data, computer programs, software, code, routines, etc., for processing by or in connection with the processor 235. In some embodiments, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (for example, a PROM, FPROM, ROM), a hard disk, an optical disk (CD, DVD, Blu-Ray™, etc.). It should be understood that the memory 237 may be a single device or may include multiple types of devices and configurations.

The communication unit 241 is hardware for receiving and transmitting data by coupling the processor 235 and other components of the realogram analysis system 200 to the network 105 and other processing systems. The communication unit 241 is configured, for example, to receive the one or more images from the imaging device 115 and/or analysis results. In one embodiment, the communication unit 241 may include a port for direct physical connection to the network 105 or to another communication channel. For example, the communication unit 241 may include an RJ45 port or similar port for wired communication with the network 105. In another embodiment, the communication unit 241 may include a wireless transceiver (not shown) for exchanging data via the network 105 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP.

The data storage 243 is a non-transitory memory that stores data for use in providing the functionality described herein. For example, the data storage 243 may store images received from the image capture device or other sources, analysis results for the images, data structures for use in image analysis, for example a known object index with feature points used for identifying objects in the image, and the like. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk, a floppy disk, a CD-ROM device, a DVD-ROM device, a DVD-RAM device, a DVD-RW device, a flash memory device, or some other mass storage device for storing information on a more permanent basis.

The object recognition module 201 includes software and/or logic to detect and identify objects in an image. While a product in an image of a retail shelf or display is used throughout the specification as an example of an object, objects may be other recognizable features in an image of any environment, for example, documents, books, or the like. The object recognition module 201 may detect and identify objects in an image according to existing public and/or proprietary image recognition algorithms. For example, the object recognition module 201 may use a computer vision BoW (Bag of Words) approach to match detected objects with images of known objects stored in a search database on the data storage 243. For example, using a scale-invariant feature transform (SIFT) algorithm, the object recognition module 201 extracts feature points for a detected object and compares the feature points to the search database. For the comparison, the feature points from the detected object and an image in the search database are matched based on a k-nearest neighbors (KNN) or similar algorithm.

In some embodiments, the object recognition module 201 may be implemented using programmable or specialized hardware including a field programmable gate array (FPGA) or an application-specific integrated circuit (ASIC). In some embodiments, the object recognition module 201 may be implemented using a combination of hardware and software executable by processor 235. In some embodiments, the object recognition module 201 is a set of instructions executable by the processor 235. In some embodiments, the object recognition module 201 is instructions stored in the memory 237 and is accessible and executable by the processor 235. In some embodiments, the object recognition module 201 is adapted for cooperation and communication with the processor 235, the memory 237 and other components of the realogram analysis application 103 via the bus 220.

Although the realogram analysis application 103 depicted in the example of FIG. 2 includes a single object recognition module 201, it should be recognized that one or more additional object recognition modules may be used for product detection and identification. Likewise, the object recognition module 201 may process individual images serially or in parallel. Additionally, the object recognition module 201 may stitch multiple images received from the imaging device 115 into a single image for processing. In some embodiments, the object recognition module 201 may begin performing recognition on images received from imaging device 115 while the imaging device 115 is still capturing images to be used in creating a final realogram.

The segmentation module 203 includes software and/or logic to generate a plurality of image segments (for example, superpixels, a coarse grid, or the like) in each image for use in the image analysis as described in more detail below. It will be recognized, that the techniques discussed herein can apply to various image segments and segmentation methods, such as a coarse grid, superpixels, etc., although one or the other may be used for descriptive purposes in the examples below.

The shelf/label detection module 205 includes software and/or logic to identify shelf fronts and product labels (for example, price tags, bar codes, etc.) on the shelf fronts as described in more detail below. The empty space module 207 includes software and/or logic to identify empty space on shelves in the realogram image to determine areas where products may be "out of stock" as described in more detail below. The multiples module 209 includes software and/or logic to detect multiple objects with similar features that are not recognized by the object recognition module 201 and identify the objects as unknown or unidentified products.

The various modules of the realogram analysis application 103 may be implemented using programmable or specialized hardware (for example, a field-programmable gate array (FPGA) or an application-specific integrated circuit (ASIC)) or using a combination of hardware and software executable by processor 235. For example, the modules may be a set of instructions stored in the memory 237 and accessible and executable by the processor 235. The function of the various modules are described in more detail below.

Figure 3:
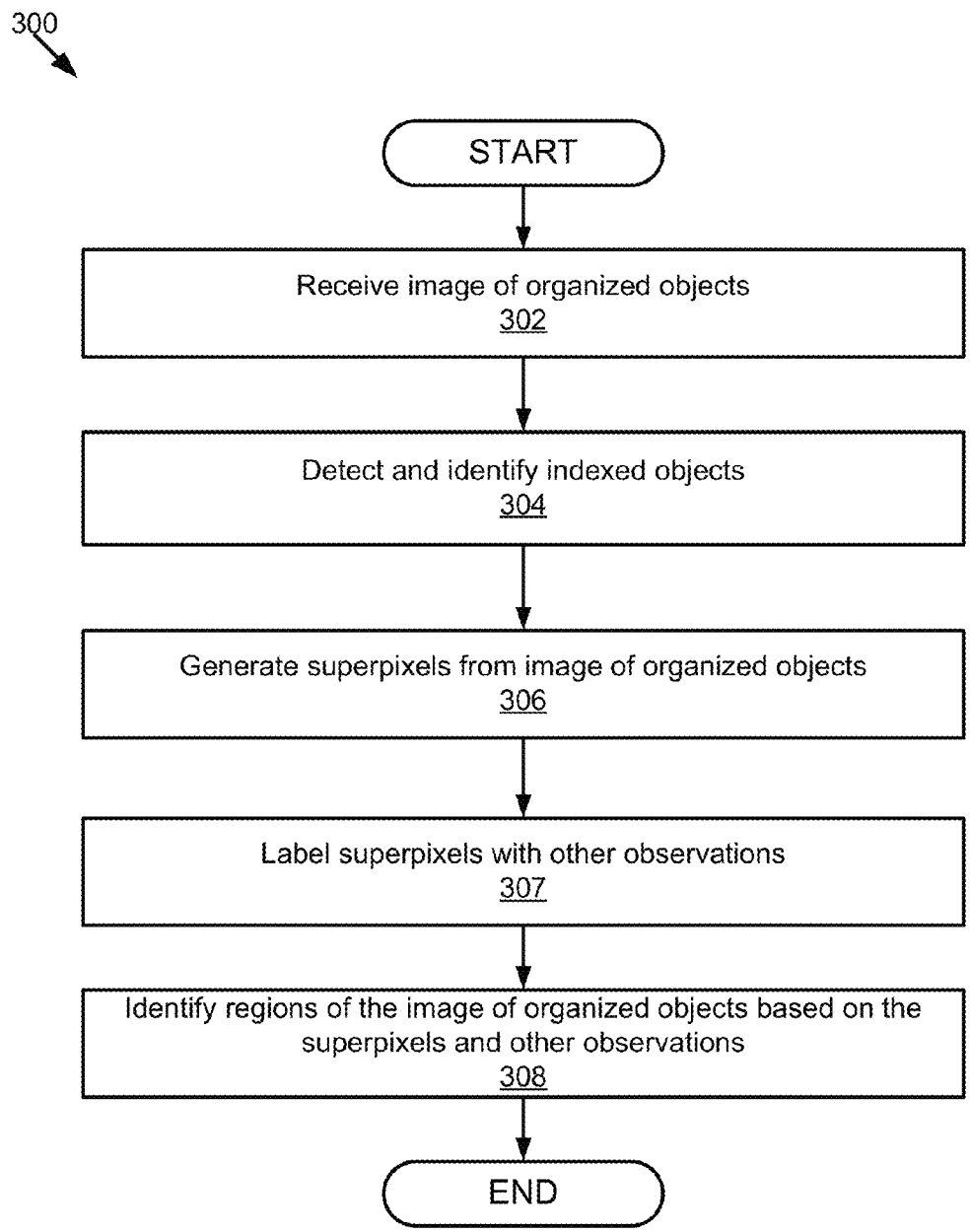
FIG. 3 is a flow diagram of an example method for realogram scene analysis based on superpixels.
Figure 4:
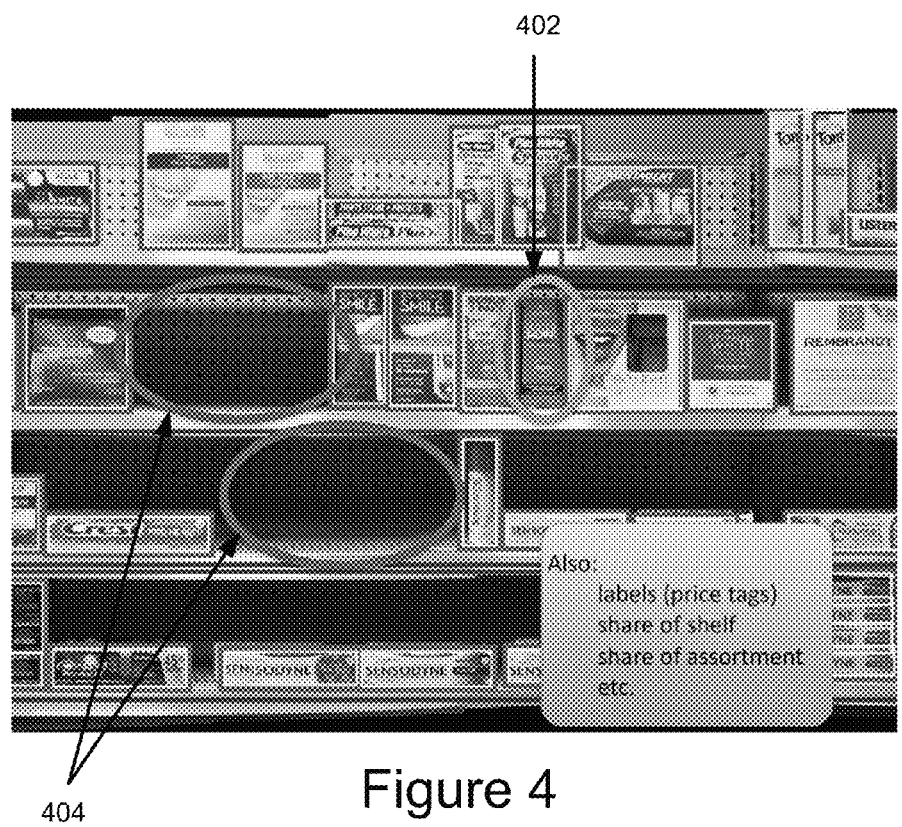
FIG. 4 illustrates an example realogram.

FIG. 3 is a flow diagram of an example method 300 for realogram scene analysis based on superpixels. In some embodiments, the image may be divided into superpixels. In some embodiments, the method 300 is used to identify features in an image, such as a realogram of shelves in a store. A realogram (for example, as is depicted in FIG. 4) is an image of a real life implementation of the subject of a planogram. A planogram is a visual representation of products displayed in a retail environment, for example, the placement and quantity of products on a shelving unit. A facing, as used herein, is a stack of products (or a single product that is not part of a stack). In a planogram (for example, a depiction of a planned product layout), if the facing has more than one product, those products are identical. In a realogram (for example, an image of the actual product layout in a store), a facing might have a mix of products. The method 300 may be used, for example, to determine the locations of shelves, labels, indexed products (for example, products indexed for identification with an image recognition algorithm), unindexed products (for example, products not indexed for identification with an image recognition algorithm), and empty space (for example, areas where products are out of stock), etc. in a realogram.

FIG. 4 illustrates an example realogram (for example, an image of products on a store shelf). In the example of FIG. 4, the products in the image include multiple boxes of various dental care products. However, it should be recognized that an image can include any number, size, and variation of products (or other objects) to be detected and identified by the realogram analysis application 103. The example realogram also depicts an unindexed product 402, indexed products (for example, the products depicted with a bounding box), and out of stock areas 404. In some embodiments, an auditor/sales force representative may capture the realogram image using an imaging device 115 (for example, a laptop computer, a tablet computer, a mobile telephone, a personal digital assistant (PDA), a mobile email device, a webcam, a digital camera, or the like). In one embodiment, the auditor/sales force representative captures multiple images of a large shelf at a retail store and each image may cover a portion of the shelf the images may be stitched together or analyzed in series or parallel by the realogram analysis application 103 as described elsewhere herein. In other embodiments, the realogram may be captured automatically by an automated image capture device. This automatic image capture may take place, for example, on a periodic basis. While the examples herein describe a realogram as an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

Returning to the example of FIG. 3, at 302 the realogram analysis application 103 receives a realogram image of organized objects, (for example, a retail display). For example, the image may be captured by imaging device 115 (for example, a digital camera, cell phone, robot mounted camera, etc.) and uploaded to the realogram analysis application 103 for analysis.

At 304, the object recognition module 201 may detect and identify objects in an image according to existing public and/or proprietary image recognition algorithms to match detected objects with images of known objects stored in a search database on the data storage 243. In some embodiments, the object recognition module 201 generates an identified region or bounding box for each identified object in the one or more images and outputs a recognition result. In some embodiments, the object recognition module 201 generates a list of inliers which are pixel locations where features in the image match features stored in the search database. In the example of products on a retail shelf, the recognition result for each product may include, for example, an object ID (for example, a stock keeping unit (SKU)). The recognition results for each identified object may also include other information including a confidence of the object recognition module 201 in identifying the product.

At 306, the segmentation module 203 generates superpixels from the realogram image. In various embodiments, the segmentation module 203 may access and create superpixels from a realogram image captured contemporaneously or that has been previously captured and stored in the data storage. As used herein, a superpixel is a segment of an image including a set of pixels. A superpixel may also be referred to as a part, portion or region. For example, a superpixel is a compact part of a digital image, which is larger than a normal pixel, where each part includes pixels of approximately the same color and brightness. The advantages of using superpixels for segmentation of a realogram image is to simplify analysis of the image by limiting the number of discrete data points (for example, superpixels v. individual pixels) that require analysis. Superpixels are a good compromise between a coarse grid and representing solid color regions and edges between solid color regions. Like a coarse grid, superpixel segmentation of an image allows for choosing a scale that models objects well and helps generate a useful number of hypothesis. Superpixel algorithms attempt to create boundaries that separate regions with different solid colors and align with dominant edges in the image, so boundaries generated by the superpixel algorithms are good candidates for actual object boundaries. Superpixels are particularly useful for mapping observations that are points, line segments, bounding boxes, etc. to each other and to local image regions. Superpixels are also useful for estimating probabilities and making decisions with small neighborhood models, as described in more detail below.

The segmentation module 203 generates superpixels from an image of organized objects, for example, a realogram, by segmenting the image into compact portions based on features of the underlying image. In various embodiments, the segmentation module 203 may generate superpixels using various known algorithms. For example, the segmentation module 203 may use the Simple Linear Iterative Clustering (SLIC) algorithm, the Superpixels Extracted via Energy-Driven Sampling (SEEDS) algorithm, the Superpixel Contour algorithm, or other known public or proprietary superpixel generation algorithms.

In some embodiments, to increase computational efficiency and reduce noise per pixel in generating the superpixels, the realogram analysis application 103 scales the received realogram image to a reduced resolution. In some embodiments, images with minimum dimension of 1000 pixels or greater may be scaled by a factor of 2, 3, 4, etc. in each dimension, using the largest of these divisors such that the minimum dimension is between 500 and 1000 pixels. For example, for an image with a resolution of 3264×2448 pixels (for example, minimum dimension 2448), a factor of 4 may be used to scale the image to a size of 816×612 pixels.

In one embodiment, the scaling factor is determined based on a ratio of physical product size to pixel dimensions of the product in the realogram image. Information from image recognition results for specific products (which can both identify the product and give an image location in pixels) and size knowledge about these products can be used to determine an approximate ratio. For example, images can be scaled so that 14 pixels corresponds approximately to one inch.

Figure 5A:
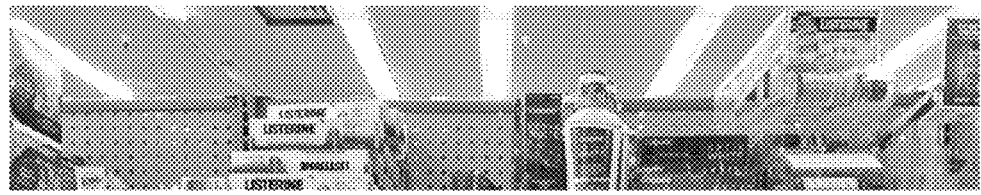
FIG. 5A depicts an example realogram including shelves and products on shelves.
Figure 5B:
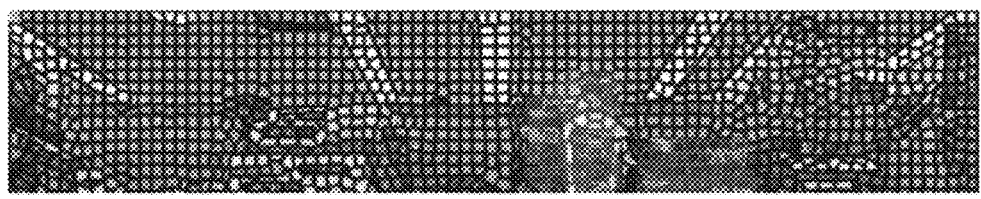
FIG. 5B depicts the example realogram superimposed with superpixels.

FIG. 5A depicts an example realogram including shelves and products on shelves. FIG. 5B depicts the example realogram superimposed with superpixels (for example, superpixels) generated by the segmentation engine 203.

Returning to the example of FIG. 3, at 307, the realogram analysis application 103 labels superpixels with other observations. In some embodiments, the segmentation module 203 may label superpixels with additional information or observations. For example, the segmentation module 203 may also include knowledge about expected products such as size (height, width, depth) and/or whether the products are displayed on a shelf or by hanging, image recognition results for specific products, image recognition results for specific products grouped into facings (for example, stacks), and line segments detected in the image. In some embodiments, the features (for example the other observations used to label superpixels) are solid color regions, edges between solid color regions, dominant edges, points, line segments, bounding boxes, regions of similar color or brightness, etc. In one embodiment, the superpixels may be labeled with results from specific product recognition results. For example, superpixels that are in a bounding box for recognized products, have inliers for recognized products (for example, one or more pixels of the superpixel correspond to the location of features used for product recognition), are below a facing, or that intersect with long horizontal line segments are labeled accordingly. In one embodiment, the realogram analysis application 103 uses the Line Segment Detector (LSD) algorithm to detect line segments in the realogram image. A line segment is determined to be horizontal if the extent in the horizontal direction is at least twice the extent in the vertical direction. In one embodiment, the segmentation module 203 only labels superpixels with line segments that are not in recognized products. In another embodiment, the segmentation module 203 only labels superpixels with line segments that are longer than the longest expected products. In another embodiment, the segmentation module 203 only labels superpixels with line segments that are longer than the longest recognized product.

At 308, the realogram analysis application 103 identifies regions of the realogram based on the superpixels and, in some embodiments, other observations. For example, other observations may include attributes of a realogram, such as object identification results, line segments detected in the realogram image, clusters of superpixels (for example clusters based on color), or regions of the realogram, although other observations are possible. The realogram analysis application 103 may identify regions such as shelves, labels on shelves, areas stocked with unindexed products, out of stock areas, and/or other regions present in a realogram image using the superpixels and other observations. The methods and operations of identifying regions of a realogram are described in further detail below.

In some embodiments, the regions identified by the realogram analysis application 103 may be key performance indicators (KPIs) for retail execution or useful for another purpose. The regions may also be used to determine KPIs. For example, shelf regions may be used to group indexed objects by shelves into linear groups. Shelf, indexed object, and unindexed object regions may be used to estimate metrics such as share of shelf and share of assortment.

In some embodiments, image segmentation and labeling may be optional and the realogram analysis application 103 may omit these steps and classify regions of the image based on feature points detected in the image. The image analysis application 103 may identify feature points in the image using, for example, a scale-invariant feature transform (SIFT) algorithm, a convolutional neural network (CNN), deep learning, machine learning, or the like.

Figure 6:
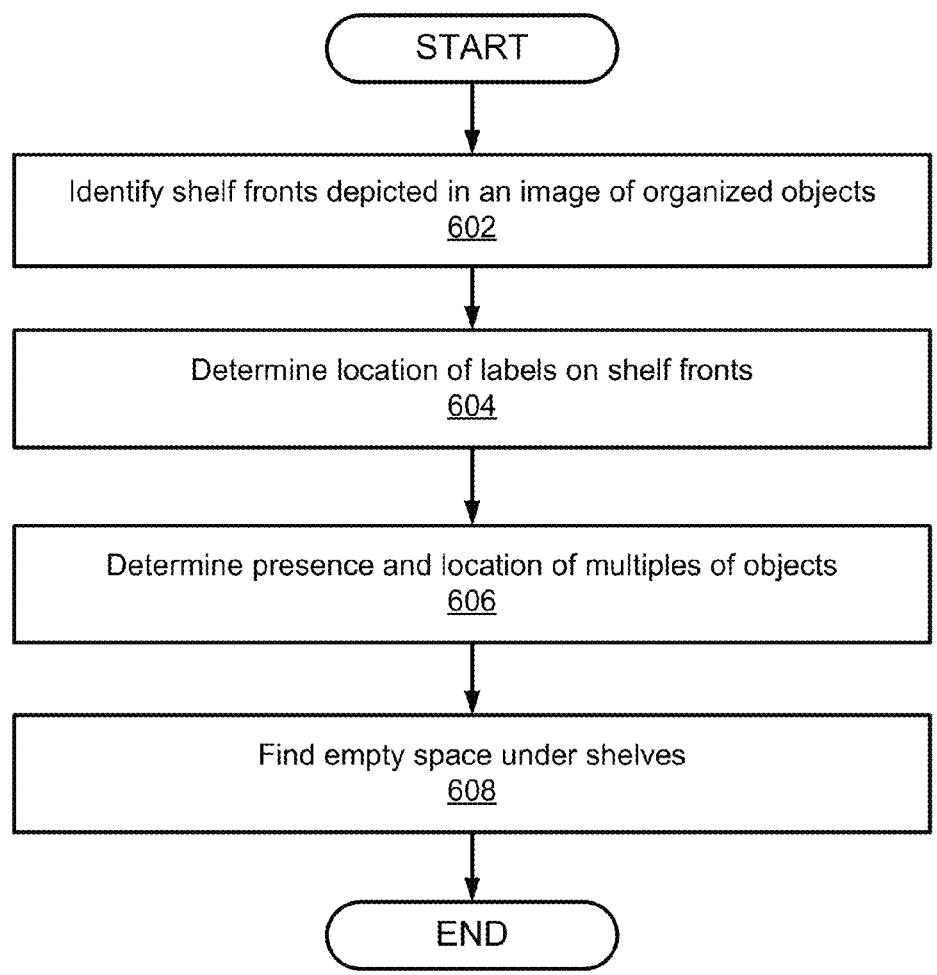
FIG. 6 is a flow diagram of an example method for identifying regions of a realogram based on superpixels and, in some embodiments, other observations.

FIG. 6 is a flow diagram of an example method 308 for identifying regions of a realogram based on superpixels and, in some embodiments, other observations. In various embodiments, to identify regions of a realogram based on superpixels, the realogram analysis engine 103, and its components, assign observations to superpixels as attributes, generate hypotheses with models based on the superpixels, validate the hypotheses with models on the superpixels, and output the analysis result. This generalization of realogram scene analysis is explained in detail in the following figures.

At 602, the shelf/label detection module 205 identifies fronts of shelves depicted in an image of organized objects. In some embodiments, the shelf/label detection module 205 may identify features based on groups of pixels in the image and create and evaluate hypotheses about possible shelf locations. For example, the shelf/label detection module 205 may determine the locations of shelves using the methods described in more detail below.

At 604, the shelf/label detection module 205 determines the location of labels on shelf fronts. In some embodiments, the shelf/label detection module 205 may determine the existence and location of labels on shelf fronts by clustering superpixels associated with shelf fronts (for example, as found in block 602) into various groups based on color and other observations (for example, line segments detected in the image). In other embodiments, the shelf/label detection module 205 may determine the existence and location of labels on shelf fronts using feature points identified in the image. For example, the shelf/label detection module 205 may determine the existence and location of labels using the methods described in reference to FIGS. 7 and 13. Information may be extracted from the labels such as price, UPC, product name or the like.

At 606, the multiples module 209 determines the presence and location of multiple objects having similar features. This operation is particularly useful to locate objects in the realogram image that have not been indexed (for example, those that are not among the objects identified by the image processor as discussed above). In some embodiments, the multiples module 209 matches feature points in the same image (for example, a realogram), clusters point pairs, and, in some embodiments, finds stacks of products (for example, vertical groups), horizontal groups and/or isolated instances of the same or similar products. For example, the multiples module 209 may determine the presence and location of multiples using the method described in further detail in reference to FIG. 17.

At 608, the empty space module 207 determines the presence and location of empty space under shelves. In some embodiments, the empty space module 207 identifies out of stock areas by determining areas lacking objects (for example, dark, homogenously colored areas and/or areas corresponding to the back of shelves such as pegboard). For example, the empty space module 207 may determine the presence and location of empty space under shelves using the method described in further detail in reference to FIG. 20.

Figure 7A:
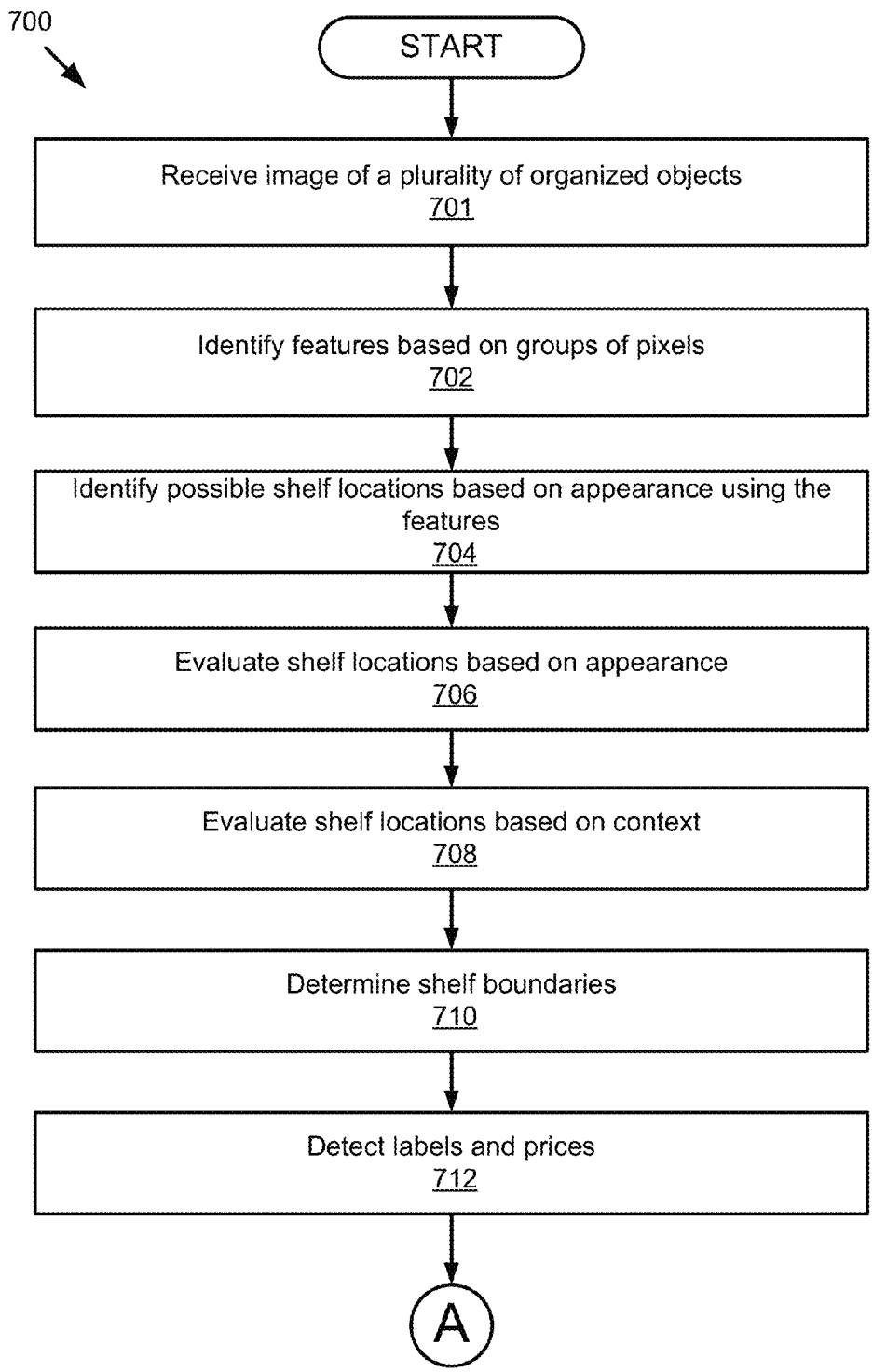
FIGS. 7A and 7B show a flow diagram of an example method for identifying shelf fronts depicted in a realogram image.
Figure 7B:
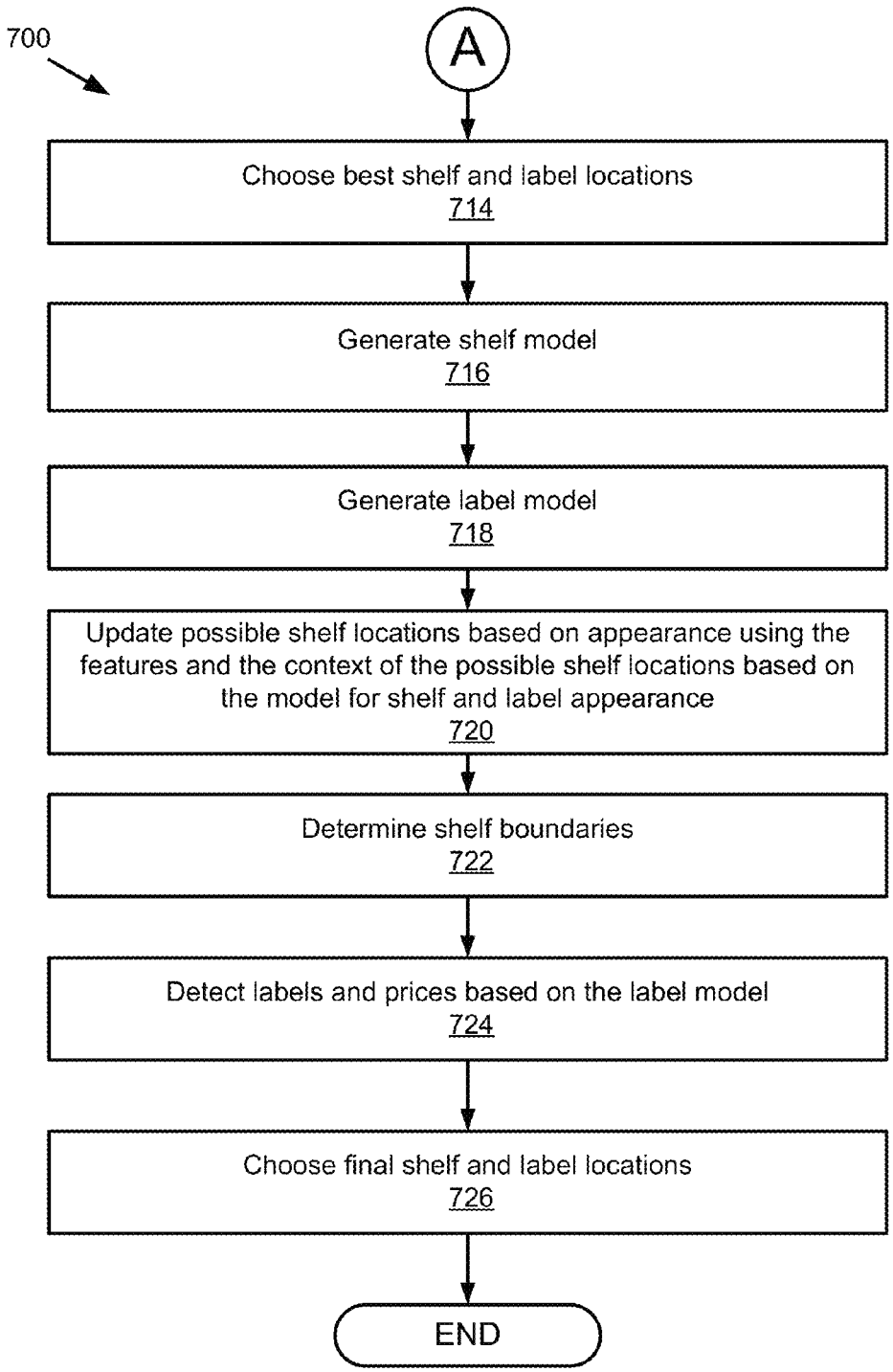

FIGS. 7A and 7B depict a flow diagram of an example method 700 for determining shelf and label locations depicted in a realogram image. At 701, the shelf/label detection module 205 receives an image of a plurality of organized objects. As described above, the image may be a realogram image of retails shelves or display.

At 702, the shelf/label detection module 205 identifies features based on groups of pixels in the image. For example, the image analysis application 103 may identify feature points in the image using, for example, a scale-invariant feature transform (SIFT) algorithm, a convolutional neural network (CNN), deep learning, machine learning, or the like. In other embodiments, the features may be superpixel shelf features based on a gradient between neighboring superpixels. A superpixel shelf feature, as used herein, is a superpixel where some of the superpixel boundary might correspond to the top or bottom edge of a part of a shelf front based on characteristics of the boundary of that superpixel and nearby superpixels. The shelf/label detection module 205 determines whether a superpixels is a superpixel shelf feature based on finding groups of four nearby superpixels at horizontal edges.

For each superpixel, its neighbors are the other superpixels where the pixels that comprise the superpixels are (8-connected) neighbors. In one embodiment, the shelf/label detection module 205 finds neighbors using a raster scan of an image-sized 2D array of superpixel labels. At each raster location where the center of a 3×3 neighborhood is different from any surround, the superpixel corresponding to the center and superpixel or superpixels corresponding to each unique different surround are neighbors. For this pair or pairs of neighbors, the list of neighbors for the/each pair is updated if the other superpixel in the pair is not already in the list of neighbors.

Figure 10:
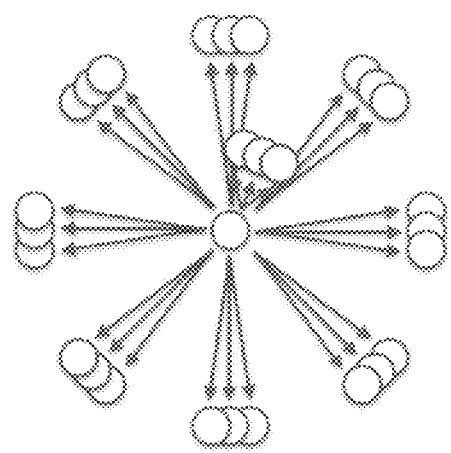
FIG. 10 is an example diagram depicting the superpixel lists at their respective angles.

In one embodiment, for each superpixel, nine lists of its neighbors are created based on the relationship of the centroids for the superpixel and each neighbor. There is one list for centroids that are close together. In the current implementation, close together is where the X distance is less than median X width of all superpixels and the Y distance is less than the median height of all superpixels. For neighbors that are not close together, the angle of the vector from the superpixel to the neighbor is quantized to 0, 45, 90, 135, 180, 225, 270 or 315 degrees and eight lists of superpixels correspond to these eight angles. FIG. 10 is an example diagram depicting the superpixel lists at their respective angles.

Figures 12A, 12B:
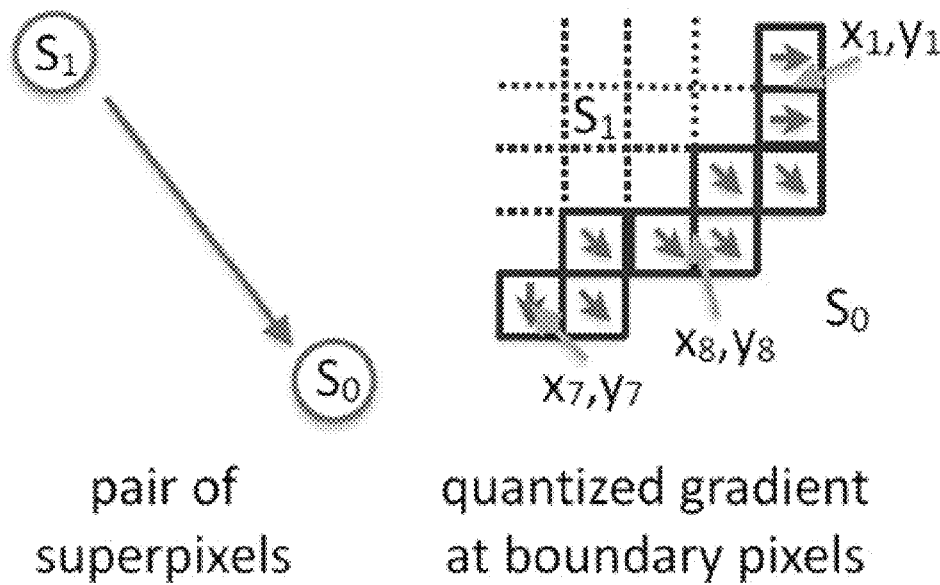
FIG. 12A is an example diagram depicting quantized gradients at superpixel boundaries.
FIG. 12B is an example data structure showing quantized gradients for a pair of superpixels.

In one embodiment, a Sobel gradient is computed in the X and Y directions of the image and converted to polar (magnitude and angle) coordinates. In one embodiment, the shelf/label detection module 205 computes this gradient independently on R, G and B components and uses the magnitude and angle for the component with the largest magnitude. FIG. 12A is an example diagram depicting quantized gradients at superpixel boundaries. Magnitudes and gradients are quantized to one of nine indices. FIG. 12B is an example data structure showing quantized gradients for a pair of superpixels. One index (the "small magnitude" index) is used when the magnitude is less than a threshold (for example, 16). This index is used to indicate superpixels that do not have a distinct boundary between them. Otherwise, the angle is quantized to 0, 45, 90, 135, 180, 225, 270 or 315 degrees and a corresponding index is used for these eight angles. These eight indices indicate superpixels that have a distinct boundary between them.

In one embodiment, for each pair of neighboring superpixels (for example, S1 and S0 in the example of FIG. 12A) and for each of the gradient quantization values, an integer for a count, X coordinate and Y coordinate are initialized to 0. A raster scan of the image-sized 2D array of superpixel labels is performed. At each raster location where the center of a 3×3 neighborhood is different from any surround, corresponding pairs of neighbors and gradient quantization values are determined and used to specify two locations in the data structure corresponding to each pair. For each data structure location, the count is incremented by 1 and the X and Y coordinates of the raster location are added to the X and Y values in the data structure respectively. After the raster scan, the count values in the data structure are the number of the boundary pixels for a pair of superpixels that have the same quantized gradient. Finally, each X and Y value in the data structure is normalized by dividing by the corresponding count. The X and Y values in the data structure are now the centroid of the boundary pixels for a pair of superpixels that have the same quantized gradient.

To determine if each superpixel is a superpixel shelf feature or not, the shelf/label detection engine 205 first excludes superpixels labeled as superpixels with inliers from product recognition results. The shelf/label detection engine then excludes superpixels that have side neighbors (for example, to the left or right) with a distinct boundary. In one embodiment, for the left and right neighbors (neighbors with quantized angle 0 or 180 degrees), the quantized gradient count for each neighbor is checked. If the index with the maximum count is not the small magnitude index for at least one neighbor, this superpixel is not a superpixel shelf feature (for example, the neighbor has a distinct boundary). The neighbors where the index with the maximum count is the small magnitude index are side neighbors without a distinct boundary.

Figure 11:
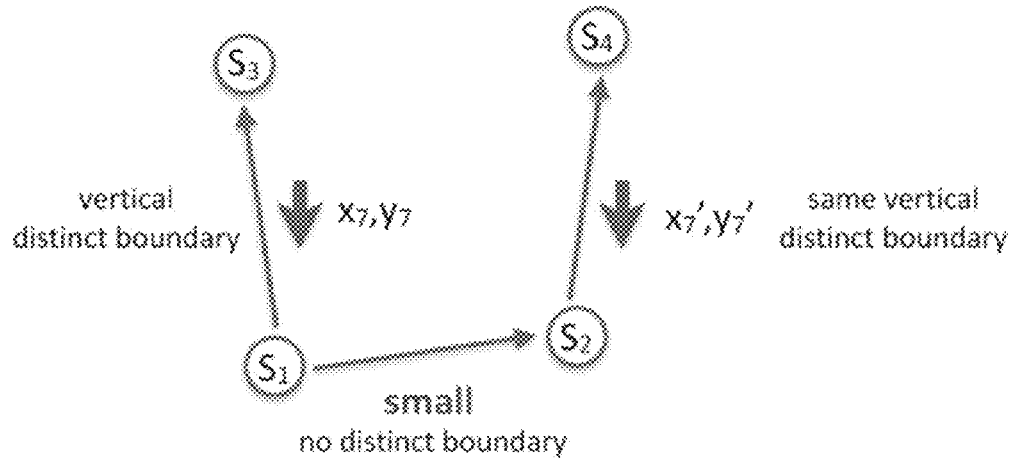
FIG. 11 is an example diagram depicting the relationship between superpixels for determining shelf appearance features.

The shelf/label detection engine 205 then determines "above" and "below" superpixel shelf features from the remaining superpixels. A superpixel is an "above superpixel shelf feature" if the gradient at the boundary with an above neighbor (for example, when the angle to the neighbor is quantized to 45, 90 or 135 degree) is vertical (for example, the gradient angle was quantized to 90 or 270 degrees), there is a side neighbor without a distinct boundary that has a different above neighbor with the same gradient index, the Y centroid of the boundary of superpixel and its above neighbor and Y centroid of the boundary of the side neighbor and its above neighbor are the same to within a threshold (for example, <5 low resolution pixels). A superpixel is a "below superpixel shelf feature" if the gradient at the boundary with a below neighbor (for example, when the angle to the neighbor is quantized to 225, 270 or 315 degree) is vertical (for example, the gradient angle was quantized to 90 or 270 degrees), there is a side neighbor without a distinct boundary that has a different below neighbor with the same gradient index, the Y centroid of the boundary of superpixel and its below neighbor and Y centroid of the boundary of the side neighbor and its below neighbor are the same to within a threshold (for example, <5 low resolution pixels). This relationship is depicted in the example diagram of FIG. 11.

The following is an example algorithm for identifying a superpixel shelf feature in a realogram image:

```
find neighbors for each superpixel
separate neighbors by distance and angle
get gradient information for the boundary between neighbors
   compute quantized image gradient
   initialize a data structure for each pair of neighbors
   accumulate counts, X and Y coordinates
   normalize X and Y coordinates
For each superpixel (determine if it is a superpixel shelf feature)
   if the superpixel has inliers from specific product recognition then
      continue
   if all side neighbors of the superpixel have distinct boundaries
      continue
   if an above superpixel has a distinct boundary then
      if the maximum count gradient at the boundary is vertical then
         if a side neighbor without a distinct boundary
            has an above superpixel with the same maximum count
            gradient then
            if the Y boundary locations for the superpixel
               and the side neighbor are the same then
               the super pixel is an "above superpixel shelf feature"
   if a below superpixel has a distinct boundary then
      if the maximum count gradient at the boundary is vertical then
         if a side neighbor without a distinct boundary
            has a below superpixel with the same maximum count
            gradient then
            if the Y boundary locations for the superpixel
               and the side neighbor are the same then
               the super pixel is a "below superpixel shelf feature"
```

Figure 8:
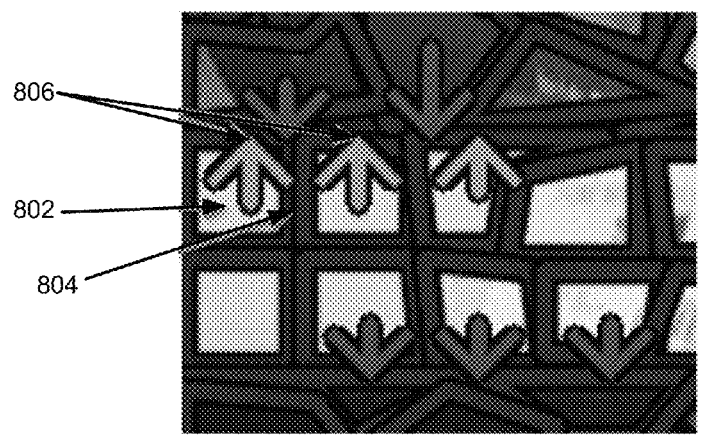
FIG. 8 depicts a portion of an example realogram superimposed with superpixels and arrows depicting the relationship between superpixels for determining shelf appearance features.

FIG. 8 depicts a portion of an example realogram, superimposed with superpixels and arrows showing those superpixels that are superpixel shelf features. Above superpixel shelf features are shown by an arrow pointing up from a superpixel centroid to its upper boundary. Below superpixel shelf features are shown by an arrow pointing down from a superpixel centroid to its lower boundary. As described above, a superpixel shelf feature is determined based on boundaries of four nearby superpixels. In the example of FIG. 8, the superpixel 802 is a superpixel shelf feature because the gradient between the superpixel 802 and its side neighbor 804 is small and boundaries between above neighbors 806 indicate a horizontal edge (for example, the most frequent quantized gradient value at the boundary are both the same vertical direction and the Y centroid of those boundary pixels is similar).

Returning to the example of FIG. 7, at 704, the shelf/label detection module 205 identifies possible shelf locations based on appearance using the features. In one embodiment, the shelf/label detection module 205 determines shelf location hypotheses by clustering superpixel shelf features by color, finding angles based on line segments, and searching superpixels using the color and angles to determine shelf location hypotheses. This process is described in more detail below. In other embodiments, the shelf/label detection module 205 identifies possible shelf locations by determining feature points that may correspond to a shelf edge.

In various embodiments, superpixel shelf features are clustered by mean color using K-means clustering, agglomerative clustering (for example Ward clustering), a Gaussian Mixture Model (GMM), other known proprietary or public clustering techniques, or technique for generating and quantizing to a color palette. In one embodiment, the shelf/label detection module 205 uses five clusters (for example k=5, 5 GMM components). Clusters can be based on various color spaces, for example, RGB, LAB, or the like. In one embodiment, the shelf/label detection module 205 may optionally ignore the color of superpixel shelf features labeled as being within recognized product bounding boxes. For example, superpixels in bounding boxes for recognized products are labeled as color 0, other superpixel shelf features are labeled as color 1, 2, 3, 4 or 5. Similarly, superpixel shelf features under hanging products can be ignored in some embodiments. In one embodiment, the shelf/label detection module 205 determines a grayscale or luminance value for each cluster. For example, the shelf/label detection module 205 may determine a mean from the GMM to determine the grayscale value. An example of clustering superpixel shelf features based on color is depicted in 906 of the example of FIG. 9.

Figure 9:
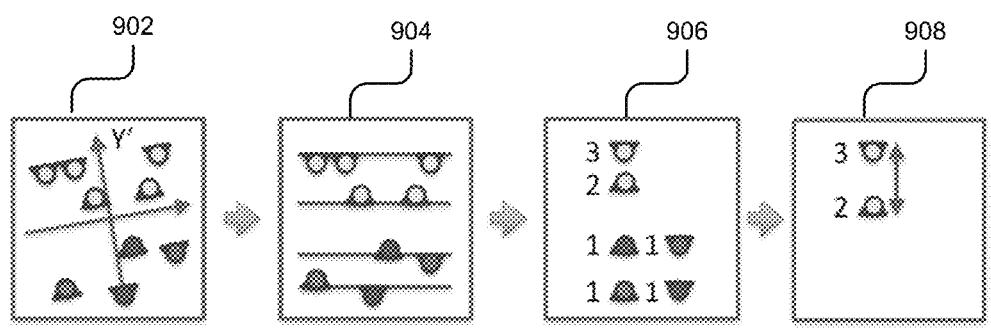
FIG. 9 is an example diagram depicting a process for detecting possible shelf boundaries.

To determine possible shelf locations from the superpixel shelf features identified by the shelf/label detection module 205, the module searches for superpixel shelf features that form lines near horizontal, as depicted in 902 in the example of FIG. 9. For example, in one embodiment, the shelf/label detection module 205 searches angles near horizontal from −0.3 radians to +0.3 radian in steps of 0.005 radians (approximately −17 degrees to +17 degrees in steps of 0.3 degrees). The shelf/label detection module 205 sorts by angles based on their frequency of occurrence in long horizontal line segments (for example, line segments with angles in the near horizontal range, not in recognized products, and longer than expected products) and frequency of occurrence in the bottom edges of products. The shelf/label module 205 sorts the angles in order of more frequent angles first. If there is no information from long line segments or products, the sort is 0 radians (0 degrees, horizontal) first. Throughout the description, the search angle at a particular iteration (for a particular hypothesis) is referred to as theta.

The following is an example algorithm for searching superpixel shelf features over theta and width:

```
for each theta in angles-to-search:
   rotate superpixel shelf feature coordinates by theta
   group superpixel shelf feature coordinates into bins for lines
   continue if groups already considered for previous theta (optional)
   rotate facing center and bottom coordinates by theta (optional)
```

```
    convert facing center and bottom coordinates to bin indices
    for each bin:
        split the superpixel shelf feature by color, gradient and
top/bottom
            for each split bin:
                count the number of superpixel shelf feature
                count the number of superpixel shelf feature with long edges
(optional)
                count the number of superpixel shelf feature inside recognized
products (optional)
                count the number of superpixel shelf feature below facings
(optional)
        for each thickness in thicknesses-to-search:
            current-hypotheses = evaluate shelf hypotheses based on appearance
            current-hypothesis += evaluate shelf hypothesis based on context
            if current-hypotheses is good:
                if there are previous good hypotheses:
                    merge hypotheses
                else
                    use current-hypothesis as new hypotheses
        for each pair of shelf hypotheses that are too close together:
            remove a hypothesis
        for each best shelf hypothesis:
            get coordinates of shelf boundary
        find superpixel shelf feature near hypotheses, remove from future
consideration (optional)
        break if shelf boundary is good or if not more superpixel shelf feature
to consider (opt.)
```

Optionally, in one embodiment, the shelf/label detection module 205 can keep track of groups of superpixel shelf features at old values of theta and only process angles that give different groups.

The shelf/label detection module 205 creates bins of sufficient size to group coordinates of superpixel shelf feature boundaries on the same horizontal line (where horizontal means horizontal after rotation by theta) into bins corresponding to the horizontal line, as depicted in 904 in the example of FIG. 9. In one embodiment, the shelf/label detection module 205 uses a bin size of six low resolution pixels. For example, the module uses 50% overlapping bins, so there is a bin for rotated Y coordinates 0 . . . 5, 3 . . . 8, 6 . . . 11, 9 . . . 14, etc.

As described herein, the thickness of the front edge of the shelf is the distance between the top edge of the shelf and the bottom edge of the shelf. In one embodiment, the shelf/label module searches from 4 to 20 bin indices (which is 2 to 10 in units of bin size units for bins with 50% overlap). In one embodiment, the "current-hypothesis is good" criteria is based on the number of labels found, the number of shelves found and a score (in that order of importance for some embodiments). The shelf/label detection module 205 determines that a "current-hypothesis is good" if a minimum number of labels is found (for example, 3) or if the current hypothesis is better than any previous hypothesis.

In one embodiment, when merging hypothesis, all hypotheses from looping over width are kept. Alternatively, when hypotheses are found that are close to other hypotheses, merging can keep only some of them in a similar manner to selecting one hypothesis in a group, as described below.

After considering all thicknesses, the shelf/label module 205 selects one hypothesis from each group of hypotheses that are close together. For example, the module 205 selects hypotheses by considering pairs of hypotheses. Pairs are considered in order so that pairs that are close together are considered first. In one embodiment, a minimum expected distance between shelves is used to determine if pairs of shelf hypotheses that are too close together (for example if the distance between the bottom of the upper shelf and top of the lower shelf is less than the expected distance). In one embodiment, the shelf/label detection module 205 uses the height of the smallest expected product as the minimum expected distance between shelves. The smallest expected product is found among the expected products (for example, products indexed in the search database). Alternatively, the minimum expected distance between shelves can be the height of the shortest recognized product. Or, in another embodiment, the minimum expected height can be a fraction of the height of the shortest recognized product, such as one half that height of the shortest recognized product to handle cases when an unrecognized product might be shorter than recognized products. When selecting hypotheses, hypotheses that have a similar thickness (for example a difference of not more than twice the bin size) can be considered together as a group. Optionally, when selecting hypotheses, hypotheses that have similar appearance based on comparison of histograms of superpixel shelf features as described below can be considered together as a group.

When removing one hypothesis from a pair of shelf hypotheses that are too close together, if one of the pair is from evaluation based on appearance as described below in conjunction with 706 (for example based on superpixel shelf feature score) and one is from evaluation based on context as described below in conjunction with 708 (for example searching under facings), the one that is from context is removed. Otherwise, if the lower hypothesis is much darker (smaller grayscale value or luminance, for example by greater than 64 for 0 . . . 255 pixels), it is removed. Otherwise, the other criteria for evaluating hypotheses described below can be used to decide which to remove. Alternatively, if the shelf/label detection module provides information about the top and bottom of labels (described in more detail below) label top and bottom locations can be used to vote for matching shelf top and bottom locations, and the hypothesis with fewer votes can be removed. Alternatively, the hypothesis with the fewer detected labels is removed. Alternatively, a hypothesis can be removed so that shelf color, label color and/or shelf thickness is consistent for all remaining hypotheses.

In one embodiment, superpixel shelf features near a selected hypothesis are removed from consideration for other values of theta. The minimum expected distance between shelves is used as the threshold for what is near in this case. Searching over theta stops if less than a threshold number of superpixel shelf features (for example 6) are to be considered. This handles the case when different shelves are at difference angles in an image, which can occur if the position of the imaging device causes the shelves to not be parallel in the image.

In an alternative embodiment, the algorithm is greedy and stops once labels are found at some value for theta. In another alternative embodiment, searching over theta continues over all superpixel shelf features and the result from the best theta value or values is used.

The shelf/label detection module determines shelf locations from the possible shelf locations (for example, the hypotheses described above). An example algorithm for evaluating and choosing a hypothesis is described below:

```
for each pair of top and bottom bins:
    compute scores for pairs and find best color
for each top bin near the bottom of the image (optional):
    compute score for top only and find best color
for each bottom bin near the top of the image (optional):
    compute score for bottom only and find best color
eliminate low scoring adjacent pairs
initialize hypothesis to pairs with best color and good score
add top only to hypothesis if color matches and good score (optional)
add bottom only to hypothesis if color matches and good score (optional)
loop (to look for more shelves under products) (optional):
    find all facings that are not supported by a shelf
    if (not the first iteration) and (no more facings are supported) then
        break
    if all facings are supported then
        break
    find a range of bins where one shelf might be
    find the best score in the range for the best color
    if a best score found then
        add shelf location hypothesis
    else
        break
get the superpixel shelf feature corresponding to the hypothesis for each shelf
get the coordinates of the shelf boundary using superpixel shelf feature
find all superpixels in the shelf hypotheses
detect labels on shelves
for each shelf hypothesis:
    count the number of labels found
```

At 706, the shelf/label detection module 205 evaluates shelf locations based on appearance. In general, shelf hypotheses are found based on superpixel shelf features that represent two parallel lines with the same color inside the lines and that might also have long horizontal edges or a have the top parallel line under facings or have darker superpixel shelf features under the bottom parallel line, as described above. Optionally, shelf edges are expected to be lighter than dark areas under shelves and superpixel shelf features that are dark are not considered as superpixel shelf features inside the parallel lines. For the 5 cluster colors (with grayscale value from 0 . . . 255 where 0 is black and 255 is white), a color is dark if it is less than 64 more than the minimum grayscale value of the 5 colors and less than 64 minus the maximum grayscale value of the 5 colors.

In one embodiment, the shelf/label detection module 205 computes a score for a pair of bins as follows. For each color (for example, for each GMM component 1, 2, 3, 4 and 5), the module finds the largest number of top superpixel shelf features (for example, those superpixel shelf features hypothesized to be the top of a shelf) for each of the two vertical gradient directions for the upper bin. Also the module 205 finds the maximum of the corresponding count of superpixel shelf features with long horizontal edges and superpixel shelf feature below facings. Similarly, for each color, the shelf/label detection module 205 finds the largest number of bottom superpixel shelf features for each of the two vertical gradient directions for the lower bin. Also the module 205 finds the corresponding count of superpixel shelf features with long horizontal edges. Optionally, the module 205 finds the number of top superpixel shelf features for the bottom parallel line that are darker (for example 64 or more difference in grayscale for 0 . . . 255 grayscale). Further, for each color, the module 205 finds the minimum of the top and bottom counts for that color. The color with the maximum value is the best color (for example, the shelf hypothesis color) and maximum value is the best count. The shelf/label detection module 205 determines a score for a hypothesis as the sum of the best count and the larger of the long edge/facing/darker superpixel shelf feature counts for that color clipped so the sum is not more than twice the best count.

In another embodiment, the shelf/label detection module 205 computes histograms for a pair of bins. There is one histogram based on color for each of the top superpixel shelf features for the upper bin, the bottom superpixel shelf features for the upper bin, the top superpixel shelf features for the lower bin and the bottom superpixel shelf features for the lower bin. Different shelf hypotheses can be compared by comparing the histograms.

In another embodiment, the shelf/label detection module 205 computes another score for a pair of bins by considering only superpixel shelf features where top and bottom superpixel shelf features are nearby. Two superpixel shelf features are nearby if their X coordinates differ by less than a threshold. In one embodiment, the threshold is $T/\tan(\arcsin(B/T))$ or equivalently, $T \times \sqrt{1-(B/T)^2}/B$ where T is the shelf thickness and B is the bin spacing. In one embodiment, the X coordinate is the original image X coordinate. In another embodiment, the X coordinate is in the coordinate system rotated by theta.

At 708, the shelf/label detection module 205 evaluates shelf locations based on context. In various embodiments, context can be used to evaluate shelf locations. This can include information from object recognition module 201, information from shelf detection in overlapping images, hypotheses based on assuming regular spacing between shelves or other prior information, and the like. Bonuses can be added to the score for a hypothesis to improve selection of the best hypothesis. If a product is sitting on a shelf, the bottom edge of the product is at the same location as the top edge of the shelf. Similarly, the bottom edge of a facing is at the same location as the top edge of the shelf. In a realogram image (a 2D projection where vertical position in the image does not necessarily correspond only to vertical position in 3D space), the comparison of location should either explicitly take 3D geometry into account or use an approximation for same location that allows for 3D effects. For example, in one embodiment, the shelf/label detection module compares the bottom bin coordinates for facings with the top bin coordinates for shelves and any facing that has no shelf top within T bins is considered to not be supported by a shelf where, for example, T=1.5*thickness, where thickness is the distance between the shelf top and shelf bottom in bins for the current shelf hypotheses.

Note that the case of hanging products that are not sitting on a shelf is handled by stopping the iteration when no shelves are found. Optionally, if any recognized products are known to be hanging products, these products can be removed from consideration as products not supported by a shelf.

To find a range where one shelf might be, the shelf/label detection module 205 groups facings that have bottoms that are less than a shelf thickness apart, and uses one less than the minimum and one more than the maximum bin coordinates of the group (ignoring the one less and one more locations if those bins do not exist).

In some embodiments multiple overlapping images of the same scene are used. The geometric relationships between the images are determined using an existing public and/or proprietary stitching algorithm. Shelf detection is performed on multiple images. Locations for shelf hypothesis are transformed to the coordinate system determined by the stitching algorithm. In one embodiment, hypotheses are selected to jointly maximize score for shelves in consistent locations in the multiple overlapping images. In another embodiment, shelf hypotheses in one image are given bonuses if there are shelf hypothesis in a corresponding location in another image.

In some images, the spacing between shelves is regular. The spacing between each pair of shelf hypotheses, as calculated based on appearance at 706, is found. The unique values (for example, same value to within the tolerance specified by the bin spacing) for these spacings are estimates for the shelf spacing. These spaces divided by small positive integer (for example, 2, 3, 4, 5) where the result is greater than or equal to the minimum shelf spacing are other estimates for shelf spacing. Locations that are multiples of estimated shelf spacings away from shelf hypotheses, as calculated based on appearance at 706, are used to find ranges where a shelf might be in a manner similar to finding facings that are not supported by a shelf, as described above.

At 710, based on the shelf hypotheses selected, the shelf/label detection module 205 determines shelf boundaries. In one embodiment, to determine coordinates of shelf boundaries, the shelf/label detection module returns original image Y coordinates (only) for shelves. These Y coordinates represent horizontal shelves that span the full width of the image. The module 205 selects as the top coordinate of the shelf, in one embodiment, the maximum of the top boundary centroid Y coordinates for the superpixel shelf feature for the top of the shelf ("top inliers"). Similarly, the module 205 selects as the bottom coordinate of the shelf, the minimum of the bottom boundary centroid Y coordinates for the superpixel shelf feature for the bottom of the shelf ("bottom inliers").

Optionally, shelf boundaries can represent one or more the following: shelves that are at an angle away from horizontal, shelves that do not span the width of the image such as images with multiple bays (a bay is a distinct area in a store a specific shelf configuration) or with an area that is not in any bay, shelves that are not straight in the image due to 3D or camera effects (for example piecewise linear at different angles), visible parts of shelf edges, without parts of the edges that occluded. In one embodiment, shelves at an angle can be represented by fitting two lines or a pair of parallel lines to the top inliers and bottom inliers. Shelves in an image may not be straight due to 3D or camera effects such a pincushion or barrel distortion. Shelf hypothesis for different angles that are piecewise continuous can be combined into polygons to represent shelf boundaries.

Information from shelf hypotheses includes locations of superpixel shelf feature for shelves and their color. Optionally, there is additional information such as the superpixels that are in the bounding boxes for specific recognized products or that have inliers for specific recognized products. Cases where the shelf does not span the whole image can be detected based on superpixels in full width shelf hypotheses that are not superpixel shelf features, are not similar in color and/or are associated with specific recognized products. Searching for bay boundaries might be limited to a single boundary per image that applied to all shelves (for example the search could be for a single vertical bay boundary). In one embodiment, four sided polygons or parallelograms can be used to represent shelves.

In various embodiments, some superpixels that fall within the selected shelf boundaries may be excluded from being labeled as part of the shelf. For example, if there are any inliers from recognition of specific products in the shelf hypothesis superpixels, these superpixels can be treated as not matching the shelf. These superpixels are expected to be from objects in front of the shelf edge that occlude the shelf edge. Regions of these superpixels can be combined and polygons representing shelf boundaries can be determined that exclude these areas. In some embodiments, an image segmentation method, such as GrabCut, can be initialized with shelf hypotheses superpixels as foreground (certain foreground for the superpixels that are the superpixel shelf features from the hypotheses and possible otherwise) and neighboring superpixels above and below as (certain) background. GrabCut can then be used to find superpixels in the shelf hypothesis that do not match the shelf.

At 712, the shelf/label detection module 205 detects labels and prices on shelf hypotheses. Label detection is described below in greater detail in conjunction with FIG. 13. To detect prices, the shelf/label detection module 205 extracts prices from the image using optical character recognition (OCR). An example algorithm for extracting prices from the image is described below:

```
initialize list of prices to empty
for each shelf candidate:
    clip the bounds of the shelf candidate to the bounds of the image
    if clipped region too small then:
        continue
    if candidate in cache (optional) then:
        add cached prices for candidate to list of prices
    else:
        erase any areas in clipped region that are not in the shelf
    candidate (optional)
        text detection
        OCR
        for each OCR result:
            if the result is a price then:
                add result to list of prices
        save prices for candidate in cache (optional)
```

In some embodiments, the shelf/label detection module 205 uses multiple thresholds and may run OCR multiple times on regions that correspond to each piece of text (for example, a price on a label) which often results in multiple OCR results for the same text. When this occurs, the best OCR result (for example, the result with the highest confidence) is found and used in subsequent processing. Logically, choosing the best OCR result is not necessary if the shelf/label detection module 205 does not produce multiple OCR results for the same text.

Figure 25:
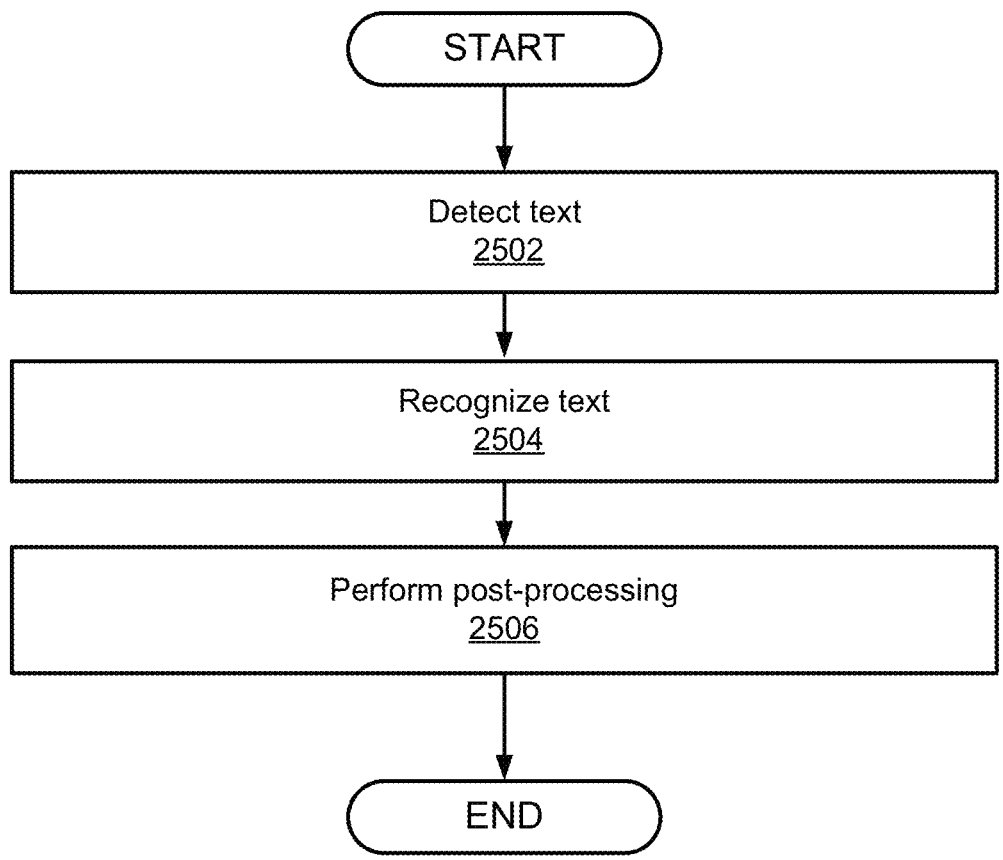
FIG. 25 is a flow diagram of an example method for extracting prices from an image.

FIG. 25 is a flow diagram of an example method for extracting prices from an image. At 2502, the shelf/label detection module 205 detects text in the image using known public and/or proprietary text detection methods and, at 2504, the shelf/label detection module 205 recognizes text and converts text images to symbolic text using known public and/or proprietary OCR methods.

OCR methods convert images with printed text to symbolic text. In some embodiments, OCR methods may perform document layout analysis, scene text detection, and/or similar pre-processing steps to generate a binary image for recognition. Document layout analysis identifies text, such as headings, columns, etc., in a document including text, photos, graphics, and other content (for example, a newspaper, a magazine, etc.). Scene text detection may include analyzing images to find text. For example, an image may include objects that contain text (for example, product boxes/containers, shelf labels, etc.). Scene text detection similarly handles text with multiple colors to create binary images for OCR. In some embodiments, OCR methods (for example, methods that do not include document layout analysis, scene text detection or similar advanced pre-processing) may take binary images generated by separate pre-processing steps as input. In one embodiment, GrabCut is used to binarize the image region for input to OCR.

OCR software is typically accurate on good images of printed text (for example, high resolution, high contrast, good focus, no motion blur, uniform illumination, etc.). However, scene images, such as images of store shelves, include lower quality images where the resolution is low with respect to the size of text, the contrast is low, and may include image degradations, such as blur due to poor focus or motion and glare due to lighting. Typical images of store shelves have large quantities of scene text in a wide variety of colors. These images also have a large quantity of graphics or line art (barcodes, logos, etc.) that is not text but may share low level characteristics of text (for example, may be composed of strokes).

Using existing scene text detection software on store shelf images may fail to find text such as the price on price labels. To increase the chance of finding text, the shelf/label detection module 205 limits scene text detection to areas in the image that are determined to correspond to a shelf or shelf hypothesis (as described elsewhere herein).

At 2506, the label/shelf detection module 205 may perform post-processing on the recognized text. Due to low resolution, blur and/or other degradations, OCR may not be able to accurately distinguish between similar characters such as "S", "5" and "$" in images of store shelves. To distinguish between these characters for price detection, the label/shelf detection module 205 may limit characters allowed for OCR to, for example, "$0.0123456789" and other characters, such as letters, are excluded. Some price tags may include a character like the cents sign ("¢") that the OCR software does not handle. Instead, OCR might confuse an unhandled character with some alternative character (for example "¢" with "c"), so allowed characters an alternative implementation may include alternative characters, for example, "$c.0123456789".

Regular expressions or other patterns can define expected sequences of characters. An example regular expression is "^\$\d+\.\d\d$" which matches a string that starts with "$", has one or more digits, a decimal point, and ends with two digits. Another example regular expression is "^\d\d?c$" which matches a string that starts with a digit, optionally has a second digit and ends with a "c" or "¢". Some OCR methods may include support for using expected sequences of characters to aid in recognition. Otherwise, the shelf/label module 205 may apply expected sequences of characters as a post-processing step. The shelf/label detection module 205 may therefore reject OCR output that does not match an expected pattern.

Similarly, OCR methods may provide alternative recognitions for each character and the shelf/label detection module 205 may use post-processing to select a result that matches an expected pattern and only reject the recognition when none of the alternatives match. In some embodiments, OCR methods provide a score or confidence value for alternative recognitions and the shelf/label detection module 205 may select the match with the highest score or confidence value.

In some embodiments, the shelf/label detection module 205 can use the location of characters with relation to others within a character bounding box to identify price text. For example, when a label includes a "$" or "¢" character in a different position than other characters (for example, superscripts in prices), the character bounding box locations can be used to distinguish prices from other text.

Additionally, post-processing performed by the shelf/label detection module 205 can correct for characters dropped during text recognition (for example, if decimal points "." are dropped and OCR returns a word break at their locations). For example, a post-processing step performed by the shelf/label detection module 205 can create alternatives for the dropped character and use pattern matching to determine an appropriate character of the alternatives to replace the dropped character.

As indicated in the example method above, caching may optionally be used so that text detection and OCR is not run more than once on the same shelf hypothesis. For example, the same hypothesis for an individual shelf may be used both for a first detection to find some prices and then later to try to find more prices. The coordinates of the lines for the shelf hypothesis can be used as a cache key.

Some shelf candidates may extend outside the image at the top of bottom of the image. These shelf candidates may be clipped to the bounds of the image to create a clipped image region to input to text detection. OCR methods typically have a minimum resolution for detecting text, which implies a minimum size for the clipped region. Regions that are smaller than that minimum size can be assumed to have no extractable text without needing to perform text detection or OCR. For example, regions that are less than 10 pixels high are assumed to have no extractable text. Typically, only shelf candidates at the top or bottom of the image with small height are too small.

Once prices and labels have been detected, the shelf/label detection module 205 identifies matching prices and labels detected in the image to verify location of labels and/or prices. A price matches a label if the price overlaps the label and the height of the overlap is at least half of the height of the price and the width of the overlap is at least half of the width of the price. In some embodiments, a height and width of a bounding box around the price is used to determine the height and width of the price.

In some embodiments, when labels are close together, multiple labels may be detected as a combined label region instead of as individual, separate labels. If there are multiple prices that are horizontally separable in a single label region, the shelf/label detection module 205 splits that label region. In one embodiment, the shelf/label detection module splits the combined label region into separate labels based on the median width of labels determined from label detection. In another embodiment, the shelf/label detection module 205 splits the combined label region based on the location and/or size of price bounding boxes.

In one embodiment, evaluating shelf locations based on appearance and evaluating shelf locations based on context comprises removing one or more hypotheses from consideration. This is advantageous to reduce the amount of total computation required by performing label detection only on the reduced number of hypotheses. In another embodiment, label detection is performed on hypotheses before removing hypotheses from consideration.

At 714, the shelf/label detection module 215 chooses the best shelf and label locations using the information from shelf location hypotheses based on appearance, shelf locations hypotheses based on context and label and price detection. In one embodiment, the best locations are chosen based on the number of labels and prices found, the number of shelves found and a score (in that order of importance for some embodiments). In another embodiment, groups of hypotheses are considered together based on width and/or superpixel shelf feature histograms as described above. In other embodiments, a machine learning method such as decision tree learning, boosting, random trees, or a SVM (support vector machine) is used to choose the locations.

FIG. 26 depicts an example of shelf hypotheses in a table. The table may be stored, for example, in data storage 243. Each row in the table is a hypothesis. Each hypothesis is described by a top bin value and a bottom bin value. The other table columns are the width in bins, the number of labels found using label detection, the score (based on superpixel shelf features), the 1 . . . 5 color index of the superpixel shelf features for this hypothesis, the luminance or grayscale value of the superpixel shelf features, and whether or not facing information from search under facings was used to generate this hypothesis. Groups of hypotheses that are too close together to be separate shelves are divided by heavy black lines (for example there is one shelf per group). For each group, the hypothesis chosen as the best hypothesis is highlighted (with a shaded background). These four best hypotheses correspond to four detected shelves.

It may be possible that not all shelves are found in the image using the methods outlined above. The shelf/label detection module 205 may attempt to find shelves that were previously missed by generating a shelf and label model to aid in additional shelf and/or label detection. At 716 the shelf/label detection module generates a model for shelf appearance based on the best shelf locations from 714. In one embodiment, the shelf model has one geometric parameter which is an estimate for the thickness of the front of the shelf. The estimate is the average thickness of previously detected shelves. In other embodiments, the shelf model may include additional geometric or color parameters.

At 718, the shelf/label detection module 205 generates a model for label appearance based on the best label locations from 714. In one embodiment, the label model may include both geometric and color parameters. One geometric parameter may be an estimate for the width of labels, determined, for example, during label and price detection 712. Additional geometric parameters in the label model may include, for example, vertical margins between price text and shelf/label edges.

The color parameters may include a Gaussian Mixture Model (GMM) for label colors, a probability threshold related to this GMM and examples of how the previously detected labels matched this GMM. In some embodiments, the label model can learn and represent AND-OR relationships among dominant colors for labels such as "labels are red and white or labels are blue and green". Label colors may be the mean colors for superpixels in the label regions identified by label detection 712. For example, a GMM computed on these label colors may contain five components, each with a three element mean vector and 3×3 covariance matrix.

In one embodiment, a probability threshold is determined by using the GMM to compute probabilities for label colors. For example, a 25% percentile probability may be used as a threshold (for example, the probability that is greater or equal to 25% of the probabilities from the label colors and less than 75% of these probabilities).

Examples for detected label matches in the GMM are determined by computing a histogram, bag or multi-set of label colors for each detected label. Each histogram bin (or equivalently bag element or multi-set element) corresponds to one of the GMM component indices (typically one of five indices). The count for each bin (or count of elements) is the number of label colors that are assigned to that GMM component by the GMM where the Gaussian probability for the assignment is greater than or equal to the threshold. In one embodiment, the example for each detected label is summarized by a set of most frequent GMM indices (for example, up to three) out of all GMM indices that occur more than once. In alternative embodiments, similar summaries could be used or the histogram (or bag/multi-set) could be used directly instead of the summary.

In one embodiment, the same label colors are used to build the GMM, for computing probabilities for the threshold, and for computing examples. In an alternative embodiment, these label colors could be divided so that different label colors are used for these purposes.

At 720, the shelf/label detection module 205 updates possible shelf locations based on appearance using the features and the context of the possible shelf locations based on the model for shelf and label appearance. Long horizontal line segments sometimes indicate an edge of a shelf. In one embodiment, the shelf/label detection module 205 may identify long horizontal line segments that are not near any shelf hypothesis and match an angle of possible shelf locations (from 704). These long horizontal line segments may correspond to an edge of a shelf that was not previously detected. The shelf/label detection module 205 attempts to identify whether a shelf appears above or below the identified horizontal lines to generate additional shelf hypotheses. Additionally, the shelf/label detection module 205 checks locations where features (for example, superpixel shelf features) are not within a shelf hypothesis to determine whether a shelf appears above or below the feature to generate additional shelf hypotheses.

The shelf/label detection module 205 may use the shelf model (for example, the shelf thickness estimate) to search for the presence of a shelf. An example algorithm for searching above and below a horizontal line or other feature is described below:

```
for top and bottom locations in (y, y+thickness) and (y-thickness, y):
    create shelf hypothesis from top and bottom locations
    determine shelf boundaries
    detect labels or prices
    validate labels
```

If the shelf/label detection module 205 finds prices or labels for either hypothesis (for example, a hypothesis above and below the feature), the hypothesis with the greater number of prices or labels is returned as a detected shelf hypothesis. If the shelf/label detection module 205 fails to find prices or labels for either hypothesis, the hypothesis does not correspond to a shelf and no result is returned.

At 722, the shelf/label detection module 205 determines shelf boundaries based on the updated shelf location hypotheses. The shelf/label detection module 205 determines shelf boundaries here similarly to the method described above with reference to 710.

At 724 the shelf/label detection module 205 detects labels and prices based on the label model. The shelf/label detection module 205 detects labels and prices by extracting prices (and then verifying that the prices are on labels) as described with reference to FIG. 13. Optionally, the location of labels where the price cannot be extracted is determined by label detection, eliminating any previously detected labels, and then validating labels to choose among hypotheses. At 726 the shelf/label detection module 205 chooses the final shelf and label locations as described above with reference to 714.

Figure 13:
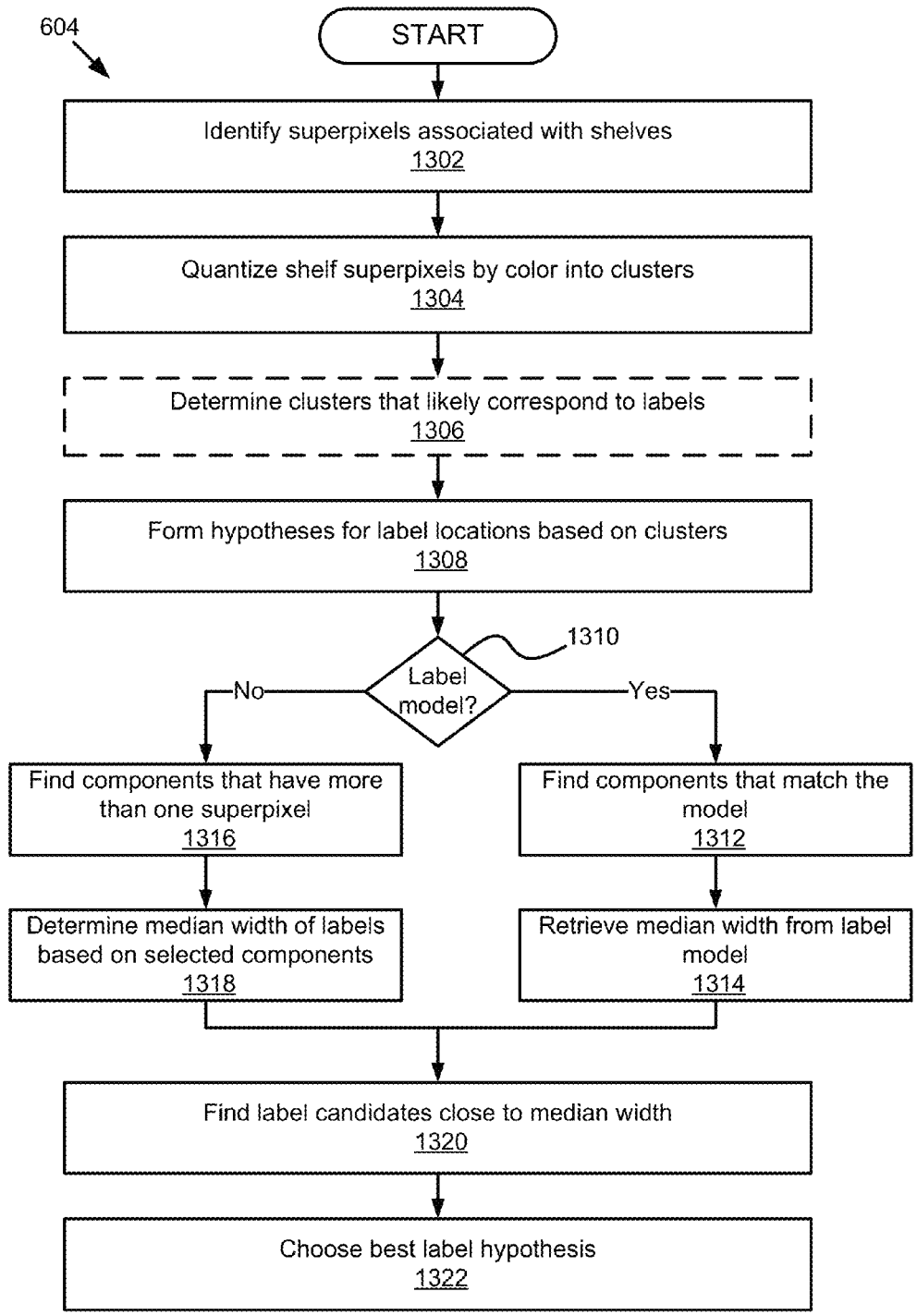
FIG. 13 is a flow diagram of an example method for detecting and determining a location of labels on shelf fronts depicted in a realogram image.
Figure 14A:
FIG. 14A depicts a portion of an example realogram superimposed with superpixels numbered to depict clusters of shelf segments.

FIG. 13 is a flow diagram of an example method for detecting and determining a location of labels on shelf fronts depicted in a realogram image. At 1302, the shelf/label detection module 205 identifies superpixels associated with the shelves, as described above. At 1304, the shelf/label detection module 205 quantizes shelf superpixels by color into clusters. For example, in one embodiment, the shelf/label detection module 205 clusters the shelf superpixels into five clusters using k-means clustering. It should be apparent that various numbers of clusters or clustering algorithms may be used to cluster the shelf superpixels. FIG. 14A depicts a portion of an example realogram superimposed with superpixels numbered to depict clusters of shelf superpixels.

Figure 14B:
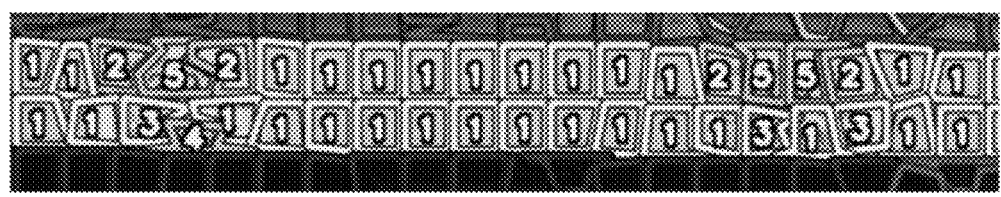
FIG. 14B depicts a portion of an example realogram superimposed with superpixels numbered to depict clusters of shelf segments.

Returning to the example of FIG. 13, at 1306, the shelf/label detection module 205 optionally determines clusters that likely correspond to labels. For example, the shelf/label detection module 205 identifies clusters with the fewest superpixels (for example, the least popular colors) as clusters that likely correspond to labels. In one embodiment, the shelf/label detection module 205 identifies the three clusters having the fewest superpixels. FIG. 14B depicts a portion of an example realogram superimposed with superpixels numbered to depict clusters of shelf superpixels. In the example of FIG. 14B, cluster 1 includes the most superpixels (for example, the most popular color) and clusters 2, 4, and 5 include the fewest.

Similarly, the shelf/label detection module 205 identifies shelf superpixels which have non-horizontal lines completely contained within their boundaries. In one embodiment, the module 205 does this by using LSD results (described above). The non-horizontal lines can be used to identify superpixels that likely are portions of labels since the lines often correspond to numbers and/or bar-codes printed on shelf labels. In one embodiment, the shelf/label detection module 205 identifies the three clusters that contain the most superpixels with non-horizontal lines. In the example of FIG. 14B, clusters 3, 4, and 5 include the most superpixels with non-horizontal lines.

At 1308, the shelf/label detection module 205 forms hypotheses for label locations based on clusters. In one embodiment, the shelf/label detection module forms hypotheses for label locations based on clusters by finding connected components of neighboring superpixels in one or more clusters.

Figure 15:
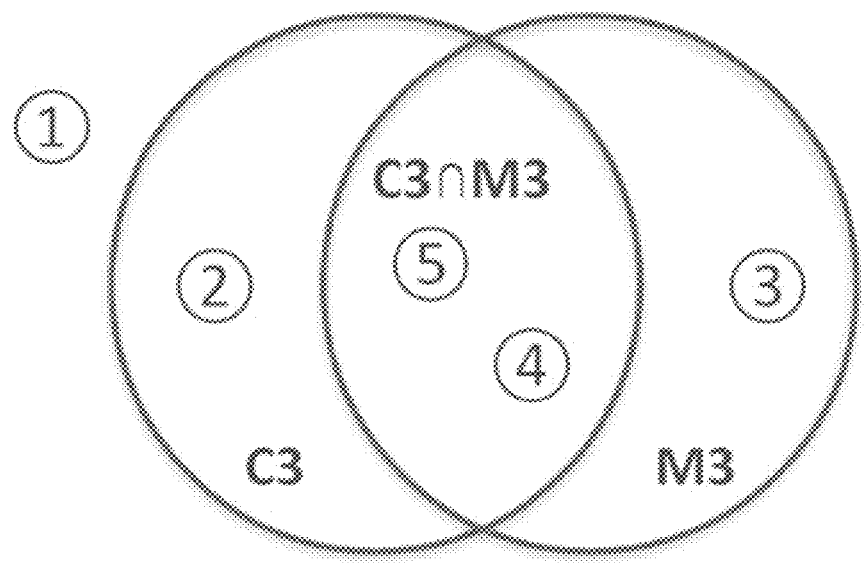
FIG. 15 is an example diagram depicting an intersection between clusters of superpixels having the fewest superpixels and having the most non-horizontal lines.

In another embodiment, the shelf/label detection module 205 determines the shelf superpixels that are both in the color clusters with the fewest superpixels and in the clusters with the most non-horizontal lines (for example, the intersection of those clusters) to form hypotheses for label locations. FIG. 15 is an example diagram depicting an intersection between clusters of superpixels having the fewest superpixels and having the most non-horizontal lines. In the example of FIG. 15, the group of clusters having the fewest superpixels based on color is labeled C3 and the group of clusters having the most non-horizontal lines is labeled M3. It can be seen from FIG. 15 that clusters 5 and 4 fall in the intersection of these two groups. The shelf/label detection module 205 uses this intersection to determine hypotheses for clusters containing label features. For example, the module 205 may test hypotheses of areas where superpixels from cluster 4 are present, where superpixels from cluster 5 are present, and areas where superpixels from both cluster 4 and cluster 5 are present. In another embodiment, in addition to generating the first set of hypotheses as just described, the shelf/label detection module 205 additionally generates a second set of hypotheses using clusters that are either not in the clusters with the fewest superpixels or not in the clusters with the most non-horizontal lines. Attempts to validate the label hypotheses, as described below, can be performed on the first set initially and if labels are not found, validation can be performed on the second set. In other embodiments, the color popularity criteria and/or the non-horizontal line criteria can be replaced by one or more other existing public and/or proprietary image feature extraction algorithms.

At 1310, the shelf/label detection module 205 determines whether a label model exists. If a label model exists, at 1312, the shelf/label detection module finds components that match the model. For example, the shelf/label detection module 205 determines superpixels that match the GMM label color from the model. If no superpixels match the GMM, the connected component does not match the model. In another example, if the width of the connected component is larger than a label (for example its width is greater than 1.5*the median label width from the model), and if there is not a matching superpixel within half the median label width at all locations in the connected component, the connected component does not match the model.

At 1314 the shelf/label detection module 205 retrieves the median width from the label model and, at 1320, determines label candidates (for example, hypothesis label locations that have components that match the model) that are close to the median width as described in more detail below. In one embodiment, the shelf/label detection module 205 determines label candidates that are close to an integer multiple of the median width.

If a label model does not exist, the shelf/label detection module 205, at 1316, finds components in the image that have more than one superpixel and, at 1318, determines a median width based on the selected components. At 1320, the shelf/label detection module 205 determines label candidates that are close to the median width.

Figure 16:
FIG. 16 depicts a portion of an example realogram superimposed with connected components of superpixels numbered to depict clusters of shelf superpixels and showing a hypothesis label location.

FIG. 16 depicts a portion of an example realogram superimposed with connected components of superpixels numbered to depict clusters of shelf superpixels and showing a hypothesis label location. At 1322 the shelf/label detection module 205 chooses the best label hypothesis. For example, the shelf/label detection module 205 determines the best label hypothesis by calculating the difference between each width and the median and comparing with a threshold (for example the smaller of 10 or half the median), scoring each hypothesis based on how many detected labels are the same width and how many do not fit within the threshold, choosing the hypothesis with the highest score, and confirming that there are at least a threshold number (for example, 5) of non-adjacent labels with similar widths along the shelf front. Optionally, label hypotheses that are not greater in width than twice the median width of superpixels are rejected. Optionally, label hypotheses that are greater than the median width by a threshold (for example 50% of the median width) are considered to be multiple labels. Optionally, hypotheses for multiple labels are split into hypotheses for single labels. Optionally, for similar (overlapping) hypotheses, label detection is only performed on some of the hypotheses. For example, label detection is performed on the hypotheses in order of high to low score, skipping any hypotheses where either a previous hypothesis overlaps (for example difference between tops and bottoms is less than half the median height of superpixels) or if previously detected labels overlap.

The shelf/label detection module 205 validates selected label hypotheses based on color and geometric parameters. For example, the shelf/label detection module 205 may generate a bounding box for a label hypothesis, expand the bounding box width to the label width from the model, determine if superpixels within the bounding box match the model, and, if the superpixels match the model, add the bounding box as a label. To determine if superpixels match the label model, a histogram (or bag or multiset) of the superpixel mean colors is computed similarly to that used for building the label model. If any example matches, the superpixel matches the label model. For example, an example matches the model if a set of indices from the hypothesis is the same as a set of indices in the model examples. In an alternative implementation that uses histograms for matching, a histogram comparison computation could be used to determine a match.

In one embodiment, validation based on geometric parameters includes identifying parameters that limit the vertical position of the text with respect to the vertical position of the shelf/label. For example, a label model may include parameters that specify an expected margin between the top of the shelf/label and the top of the price and an expected margin between the bottom of the price and the bottom of the shelf/label. To be independent of scale, margin parameters are normalized to the height of the price text. In one embodiment, the margin matches when the actual margin is within the height of the text of the expected margin. For an example shelf and label, the top margin is the height of the text and the bottom margin is twice the height of the text.

In another embodiment, validating the label hypothesis includes using an existing public and/or proprietary text detection algorithm and rejecting a hypothesis where no text was detected. In another embodiment, validating the label hypothesis includes using an existing public and/or proprietary text recognition (OCR) algorithm and rejecting a hypothesis where no text was recognized. In another embodiment, validating the label hypothesis includes using an existing public and/or proprietary object recognition or detection algorithms trained to recognize labels (for example template matching where the template is learned from labels) and rejecting a hypothesis where objects were not recognized or detected.

In some embodiments multiple overlapping images of the same scene may be received by the realogram analysis application and used in the realogram analysis. The geometric relationships between the images are determined using an existing public and/or proprietary stitching algorithm. Label detection is performed on multiple images. Locations for label hypotheses are transformed to the coordinate system determined by a stitching algorithm used to combine the multiple overlapping images. In one embodiment, validation of label hypotheses in image areas with overlap includes determining if there are label hypotheses in corresponding locations in multiple images.

In some embodiments, label detection is performed multiple times, either on different shelf hypotheses in the same image or on different overlapping images. After the first time, label detection may use an estimated width (for example median width of hypotheses) from a previous time instead of computing a new estimated width.

In some embodiments, for labels locations that are in multiple overlapping images, the image quality in each overlapping label region in each image is evaluated. The evaluation may be on the entire sub-image where a label is detected or on a sub-image in the center of where a label is detected. In one embodiment, the contrast of the regions is evaluated with high contrast indicating high quality. In another embodiment, the sharpness of the regions is evaluated with high sharpness indicating high quality. In another embodiment, spectral reflection is evaluated with low spectral reflection indicating high quality. For each label region, the highest quality region is used for further analysis and/or for display to a user. Alternatively, all regions that are judged to be of sufficiently high quality are used for further analysis. For example, considering the 0 . . . 255 grayscale values for a region, if the darkest pixel is less than 128, the region is judged to be of sufficient quality. The use of the highest quality region or high quality regions from multiple overlapping images is advantageous when non-diffuse lighting causes spectral reflection on particular labels in one image but not on another image.

In some embodiments, after labels are detected, information from labels (for example, price, UCP code, product name, etc.) is extracted. The information may be extracted using OCR, barcode reading software, or other similar existing public and/or proprietary algorithms. Label detection may include finding elements of a label (for example, the price, the barcode, the product name, etc.), cropping out one or more particular elements and extracting information on one or more particular elements. In one embodiment, the information may be extracted by people, including using crowdsourcing.

Figure 17:
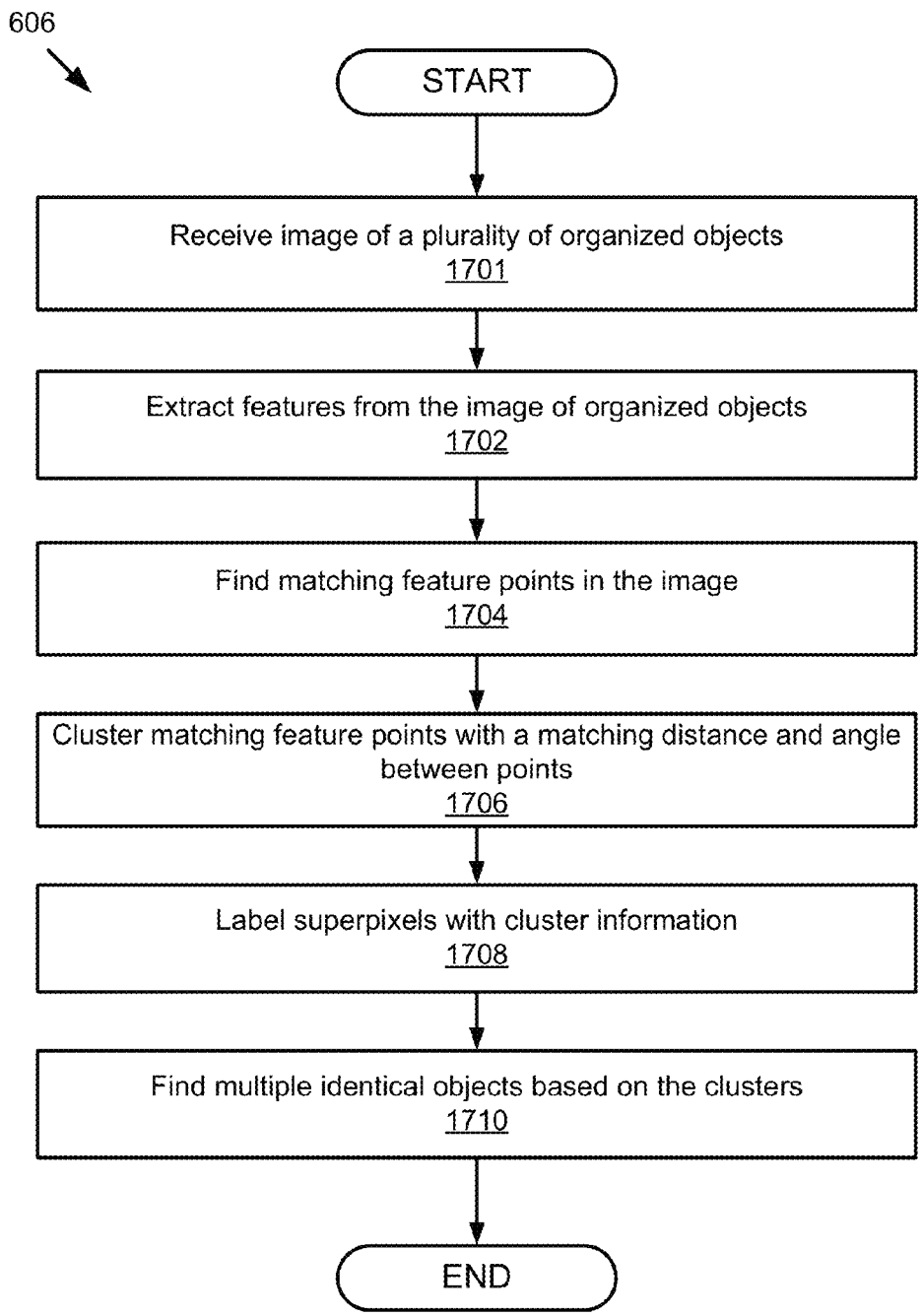
FIG. 17 is a flow diagram of an example method for determining presence and location of multiples of a particular object in a realogram image.

FIG. 17 is a flow diagram of an example method 606 for determining presence and location of multiples of a particular object in an image of organized objects. Multiples of a particular object in an image (particularly those objects not recognized by the object recognition module) can be used to help the realogram analysis application 103 determine areas that include products that are not indexed in the image search database used by the object recognition module and differentiate between various un-indexed products. At 1701, the multiples module 209 receives an image of a plurality of organized objects. As described above, the image may be a realogram image of retails shelves or display.

At 1702, the multiples module 209 extracts features from the image of organized objects. Various known feature extraction algorithms may be employed to extract image features. At 1704, the multiples module 209 finds matching feature points within the image. For example, the multiples module 209 may use a FLANK, or KDD-tree algorithm for matching feature points in the image. In one embodiment, the multiples module matches descriptor vectors using a k-nearest neighbors algorithm with k>2. In one embodiment k=25 such that the matching yields 24 good matches.

Figure 18:
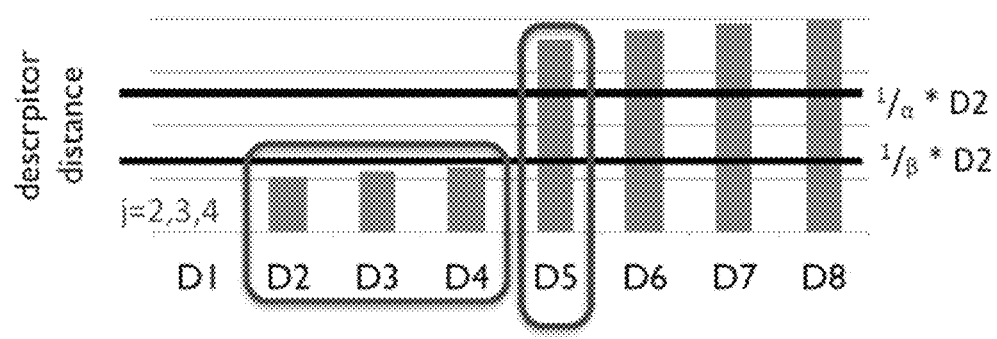
FIG. 18 depicts an example bar chart of descriptor differences for multiple matching points in an image.

In one embodiment, the multiples module 209 selects good matches (allowing for multiple matches). FIG. 18 depicts an example bar graph of descriptor distances for multiple matching points in an image. A descriptor distance, as used herein, is an indication of how similar two feature points are, with a smaller distance meaning a more similar feature. D1, D2, . . . , D8 are distances between a particular feature point and all feature points in order of increasing order. In the example of FIG. 18, the bar graph depicts only the eight smallest distances, however, it will be recognized that any number of descriptor distances may be used in the analysis. The height of the bar over the D1, D2, . . . , D8 labels represents the distance. Because, when matching in the same image, a feature point always matches itself with 0 distance, D1 is always 0 and is ignored. D2 is the smallest distance (for example, the best match) ignoring the match with itself (D1). The good matches are D2, D3, D4 (for example, where index j is 2, 3 or 4) since D3 and D4 are close to D2 and since D5 is much larger than D2. Close to D2 is determined using the threshold $1/\beta*D2$. Much larger than D2 is determined using the threshold $1/\alpha*D2$. For these thresholds, $0<\alpha<\beta<1$. In one embodiment, $\alpha$ is 0.667 and 0 is 0.800. If there are no distances between $1/\beta*D2$ and $1/\alpha*D2$ and at least one distance greater than $1/\alpha*D2$, D2 and all the other distances less than $1/\beta*D2$ correspond to good matches. Otherwise, there are no good matches.

At 1706, the multiples module 209 clusters matching feature points with a matching distance and angle between points. In one embodiment, all clusters include at least a threshold number of pairs (for example 10) where the distance (for example L1 or L2 distance) between the cluster vectors is less than a threshold (for example 20 or 32). In some embodiments, it is advantageous to perform an efficient dense search to find clusters. In one embodiment, a first clustering step separates points into clusters that are separated by at least the distance threshold using guillotine cuts (for example separating by reclusively dividing the points into clusters based on one of the X or Y coordinates of the vectors) and then uses a second clustering step using an existing public or private clustering method such as k-means on each cluster from the first step. In one embodiment, k-means clustering is used with multiple values of k, starting at 2, increasing by the number of clusters from the previous use that have vectors with distance greater than the threshold and ending when all clusters are either smaller than the threshold number of pairs or have vectors with distance less with a threshold (or a maximum number of clusters, for example 200, or a maximum number of iterations, for example 20, is reached). In one embodiment, after k-means clustering, clusters are merged if the resulting cluster has distance between the vectors that is less than the distance threshold.

The resulting cluster of feature point pairs represent matching points between similar objects in the realogram image. At 1708, the multiples module 209 labels superpixels with cluster information. For example, the multiples module 209, for each feature point pair in the cluster, identifies a corresponding pair of superpixels that contain the feature points and increments a count for the superpixel pair. For each superpixel that is part of at least one pair, the multiples module 209 labels the superpixel with the count and an identifier of the superpixel where the match is located and optionally with the cluster vector(s) and feature points.

Figure 19A:
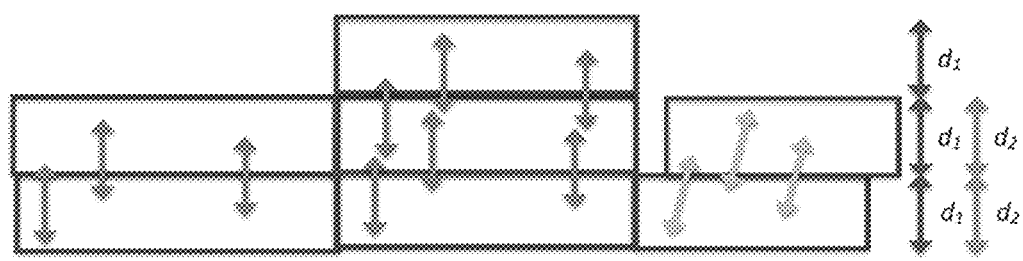
FIG. 19A depicts an example diagram of stacks of items of the same height.
Figure 19B:
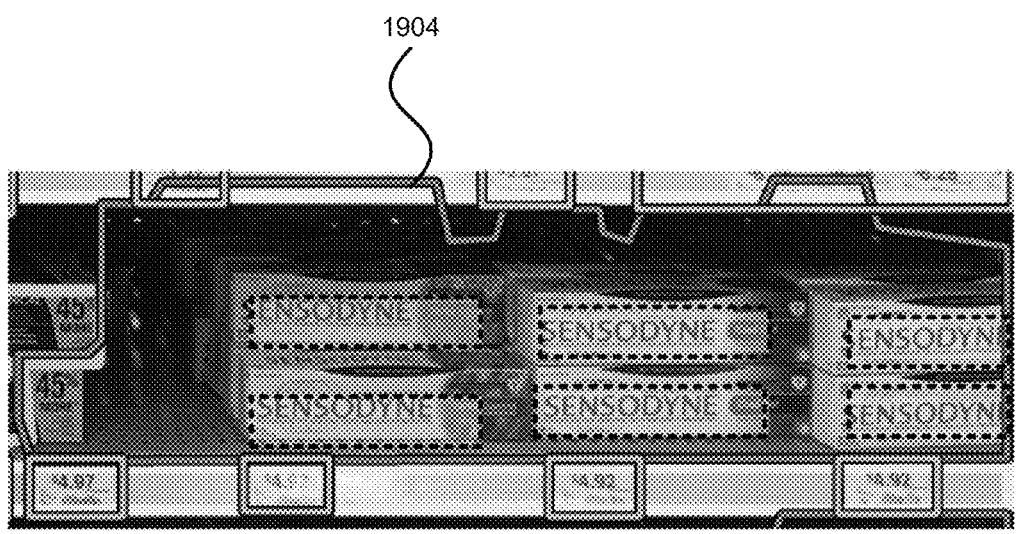
FIG. 19B depicts a portion of an example realogram superimposed with a bounding box identifying unindexed objects in the image.

Using the labeled superpixels, the multiples module 209, at 1710, finds multiple identical objects based on the clusters, for example, stacks of identical objects of similar dimension(s). FIG. 19A depicts an example diagram of stacks of items of the same height. In one embodiment, to find stacks of items of the same height, the multiples module 209 determines a median vertical distance between matches (shown as d in the example of FIG. 19A), finds a maximum number of objects in a stack based on the range and distance of the various matches, determines coordinates for the number of objects in the stack with the height d, and determines the a number of stacks of the same product (for example, d1 and d2 in the example of FIG. 19A). FIG. 19B depicts a portion of an example realogram superimposed with a bounding box 1904 identifying stacks of unindexed objects identified as similar by the multiples module (as indicated by the dashed bounding boxes) in the realogram image.

The following is an example algorithm for identifying stacks:

---

For each region where unindexed products might be
  For each superpixel in region with matches (for example, labeled with a cluster or clusters)
    For each other superpixel in pair
      If line between centroids is vertical (for example, 63-117 degrees)
        append bounding box of centroids to a list
  If the list has less than 3 unique pairs of superpixels, then continue
  Sort bounding boxes by X coordinate
  Split list into multiple lists if consecutive X coordinates differ by more than a threshold (for example 2 * smallest expected product width)
  For each list
    Find median Y distance, d, for matches (for example, between superpixel centroids or features)
      Optionally, continue if many distances not consistent with median
      Find the min and max of Y coordinates (optionally ignoring outliers)
      Determine the maximum number in a stack: num= max((Ymax−Ymin)/d,1)+1
      Determine coordinates for num rows of width d centered about (Ymax−Ymin)/2
      For each row
        Find the sorted X coordinates for matches that have Y coordinates in the row
        Split the sorted X coordinates if consecutive X coordinates differ by more than a threshold
          For each group of X coordinates
            Add the range of X coordinates and the Y coordinates for the row to the final output

---

Figure 20:
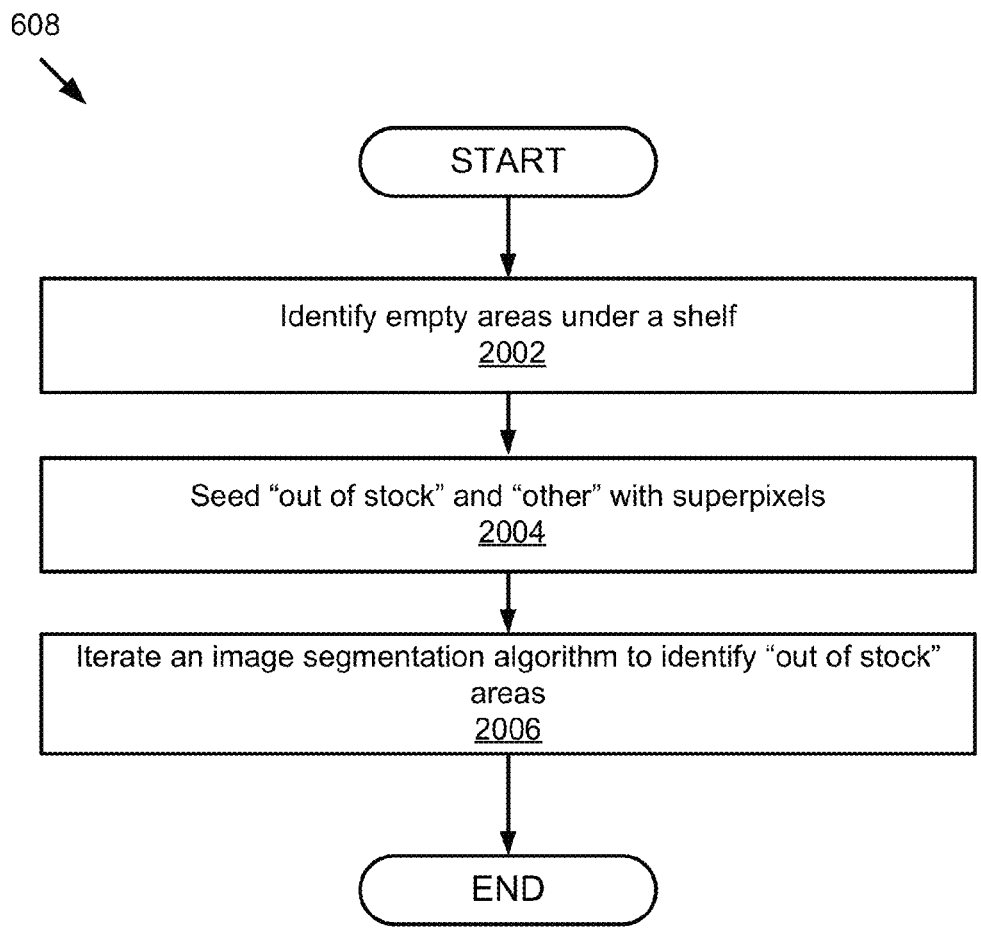
FIG. 20 is a flow diagram of an example method for finding empty space under shelves in a realogram image.
Figure 21A:
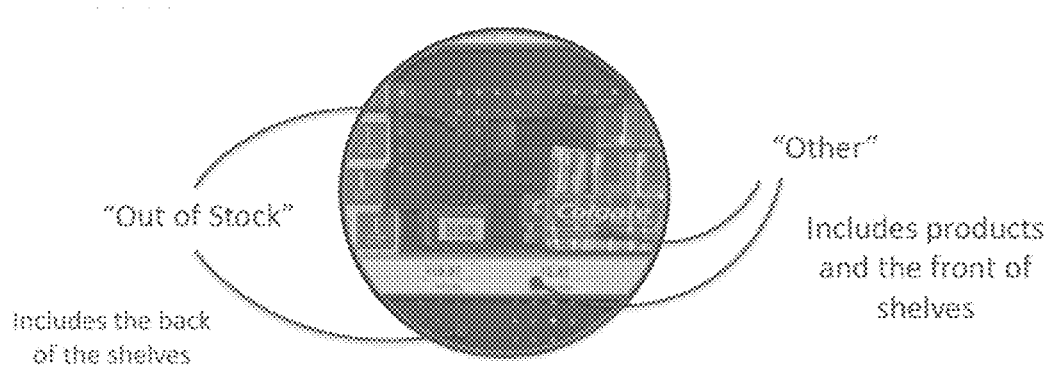
FIG. 21A depicts a portion of an example realogram identifying "out of stock" and "other" areas segmented by a segmentation algorithm.
Figure 21B:
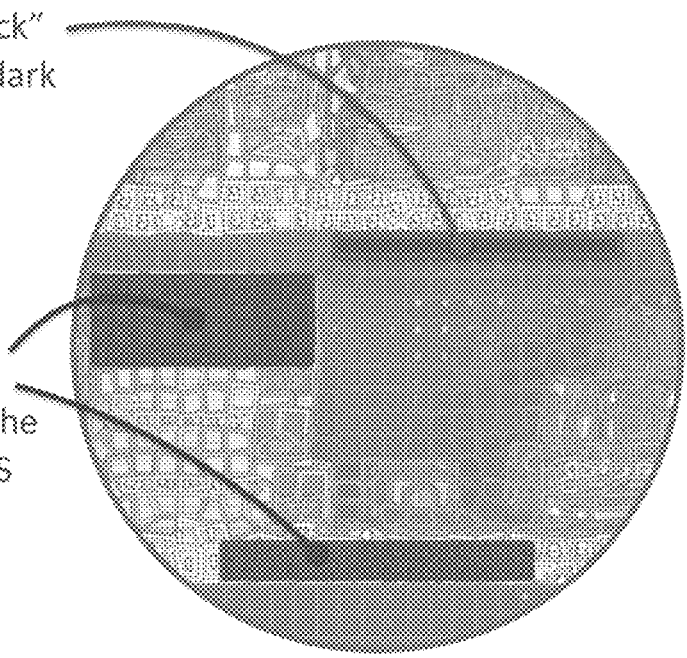
FIG. 21B depicts a portion of an example realogram identifying "out of stock" and "other" areas.
Figure 22:
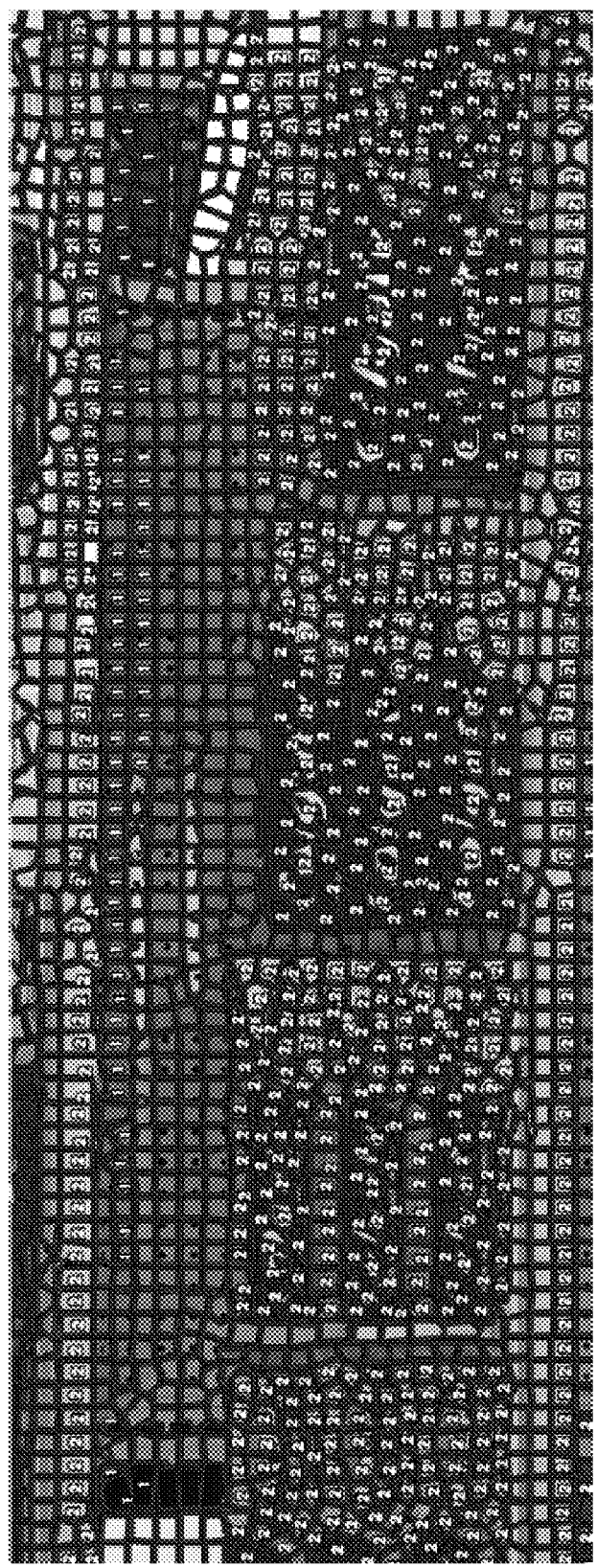
FIG. 22 depicts a portion of an example realogram identifying "out of stock" and "other" areas seeded with superpixels.

FIG. 20 is a flow diagram of an example method 608 for finding empty space under shelves in a realogram image by using a segmentation algorithm, such as GrabCut, to segment out the shelf background from the shelf fronts and products. At 2002 the empty space module 207 identifies empty areas under a shelf, for example by choosing the darkest superpixels that are directly under a shelf (and are not in the bounding box of a recognized product). FIG. 21A depicts a portion of an example realogram identifying "out of stock" and "other" areas segmented by a segmentation algorithm. At 2004, the empty space module 207 seeds the segmentation algorithm for "out of stock" and "other" areas with superpixels identified in 2002 and identified by object recognition module 201 and shelf/label detection module 205. For example, as depicted in the example of FIG. 21B, the empty space module 207 seeds the dark pixels directly beneath a shelf with "out of stock" superpixels and areas identified by bounding boxes of recognized objects and shelf fronts with "other" superpixels. FIG. 22 depicts a portion of an example realogram identifying "out of stock" and "other" areas seeded with superpixels. In the example of FIG. 22, unlabeled superpixels are unclassified, superpixels labeled with a 1 are "out of stock" areas, and superpixels labeled with a 2 are certain or probable "other" areas.

Figure 23A:
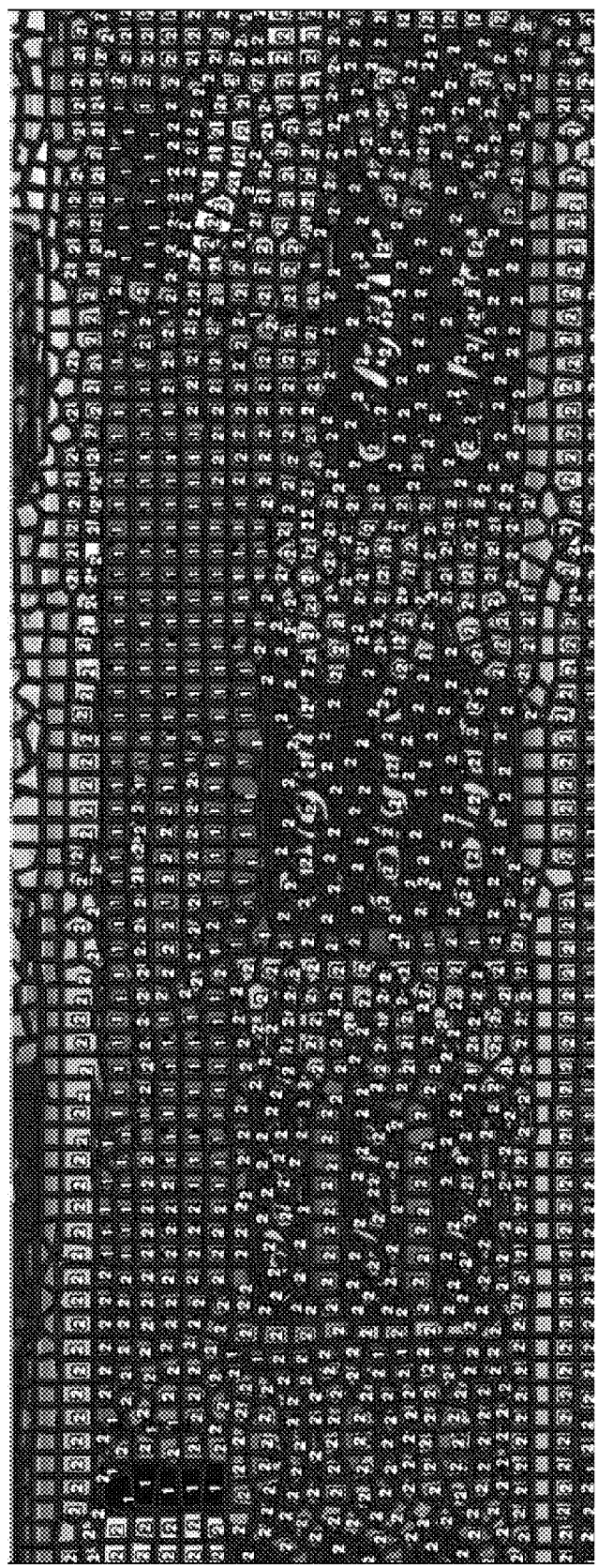
FIGS. 23A and 23B depict an example realogram superimposed with superpixels indicating out of stock or other areas after 1 iteration and 10 iterations of a segmentation algorithm, respectively.
Figure 23B:
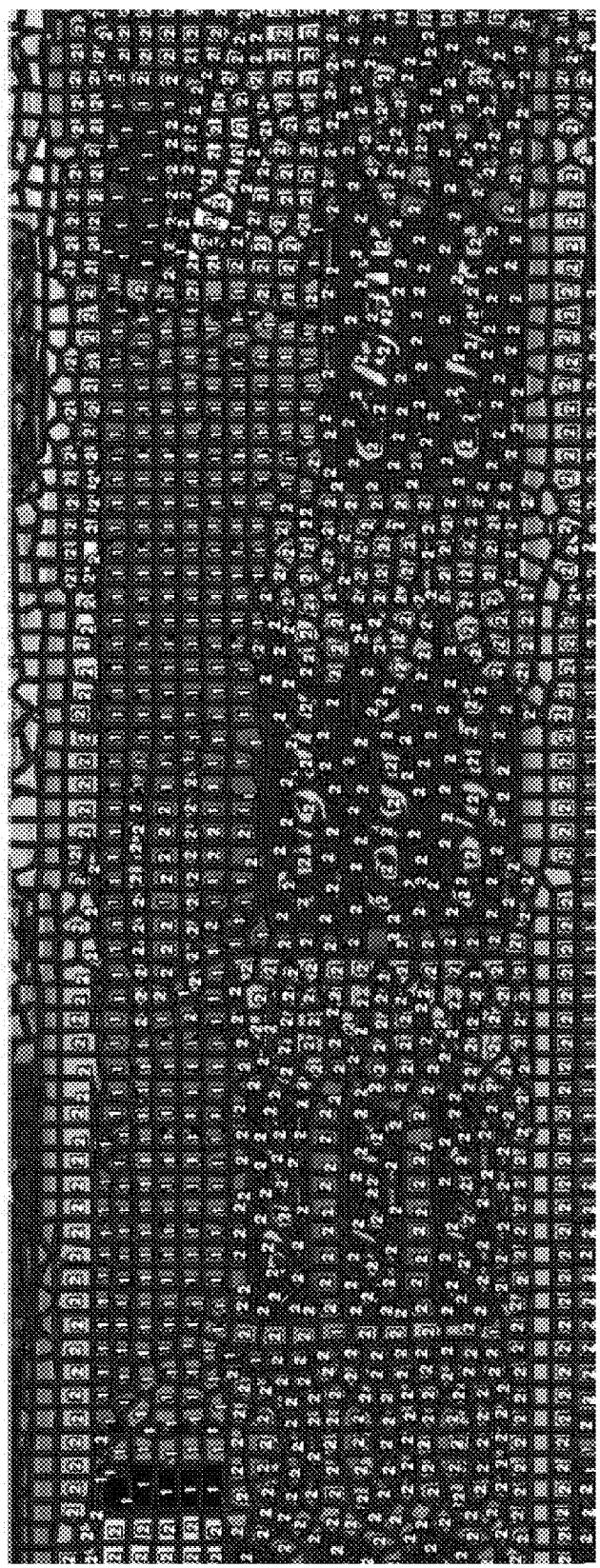

At 2006, the empty space module iterates an image segmentation algorithm, such as GrabCut, over the superpixel seeded realogram image to refine the identification of "out of stock" areas. GrabCut creates foreground and background Gaussian Mixture Models using colors selected from superpixels classified as known and probable. Unknown superpixels are initially ignored. Using the GMMs, the empty space module 207 classifies the unknown superpixels into probable "out of stock" or "other". Additionally, the empty space module 207 reclassifies some probable superpixels. New GMMs are calculated based on the reassigned superpixels and the superpixels are reclassified again based on the new GMMs. The empty space module 207 may repeat this iteration several times to achieve acceptable results. In one embodiment, the empty space module 207 performs 10 iterations to achieve an acceptable result. FIGS. 23A and 23B illustrate an example realogram superimposed with superpixels indicating out of stock or other areas after 1 iteration and 10 iterations of a segmentation algorithm, respectively.

Figure 24:
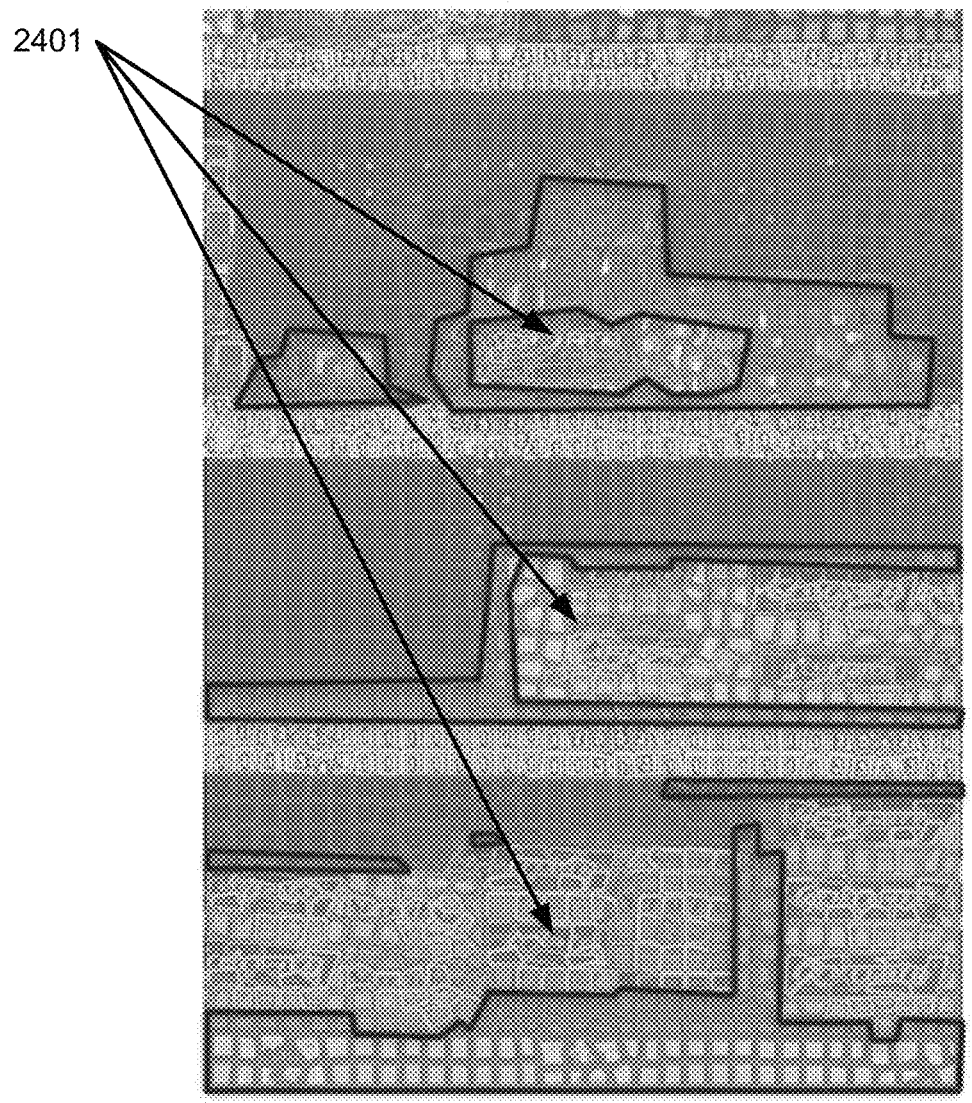
FIG. 24 depicts an example realogram superimposed with connected component polygons for potential unknown products.

After an acceptable result has been achieved, the empty space module 207 may subtract the object recognition results, shelves, and the "out of stock" areas remaining after the segmentation iterations from the total area to create connected component polygons 2401 for potential unknown products as depicted in the example of FIG. 24. In some embodiments, the empty space module 207 may refine the unknown product areas by comparing the polygons 2401 to the size of the smallest known product and eliminate those that are smaller than the smallest known product.

A system and method for realogram scene analysis has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to embodiment in any specific programming language, or for any specific operating system or environment. Accordingly, the specification is intended to be illustrative, but not limiting, of the scope of the claims, which are set forth below.

What is claimed is:

1. A computer-implemented method comprising:
receiving an image of a plurality of organized objects;
generating superpixels based on groups of similar pixels in the image of the plurality of organized objects;
labeling superpixels with information and observations from image analysis on the image of the plurality of organized objects, wherein labeling includes classifying superpixels as empty or other;
identifying empty areas under a shelf based on the classified superpixels;
iterating a segmentation algorithm on the classified superpixels to reclassify each of the superpixels as empty or other; and
identifying regions of the image of the plurality of organized objects, including empty shelf space, based on the reclassified superpixels.

2. The computer implemented method of claim 1, further comprising identifying indexed objects in the image, wherein labeling superpixels with information and observations includes labeling superpixels with an object identifier.

3. The computer implemented method of claim 1, further comprising generating region hypotheses using the information and observations.

4. The computer implemented method of claim 3, further comprising validating the hypotheses.

5. The computer implemented method of claim 4, further comprising classifying regions of the image using the validated hypotheses.

6. The computer implemented method of claim 1, wherein the regions include one or more from the group of: known objects, empty shelf space, shelf features, and labels.

7. A system comprising:
one or more processors; and
a memory, the memory storing instructions, which when executed cause the one or more processors to:
receive an image of a plurality of organized objects;
generate superpixels based on groups of similar pixels in the image of the plurality of organized objects;
label superpixels with information and observations from image analysis on the image of the plurality of organized objects, wherein labeling includes classifying superpixels as empty or other;
identify empty areas under a shelf based on the classified superpixels;
iterate a segmentation algorithm on the classified superpixels to reclassify each of the superpixels as empty or other; and
identify regions of the image of the plurality of organized objects, including empty shelf space, based on the reclassified superpixels.

8. The system of claim 7, wherein the instructions further cause the one or more processors to identify indexed objects in the image and label superpixels with an object identifier.

9. The system of claim 7, wherein the instructions further cause the one or more processors to generate region hypotheses using the information and observations.

10. The system of claim 9, wherein the instructions further cause the one or more processors to validate the hypotheses.

11. The system of claim 10, wherein the instructions further cause the one or more processors to classify regions of the image using the validated hypotheses.

12. The system of claim 7, wherein the regions include one or more from the group of: known objects, empty shelf space, shelf features, and labels.

13. A computer program product comprising a non-transitory computer usable medium including a computer readable program, wherein the computer readable program, when executed on a computer causes the computer to:
receive an image of a plurality of organized objects;
generate superpixels based on groups of similar pixels in the image of the plurality of organized objects;
label superpixels with information and observations from image analysis on the image of the plurality of organized objects, wherein labeling includes classifying superpixels as empty or other;
identify empty areas under a shelf based on the classified superpixels;
iterate a segmentation algorithm on the classified superpixels to reclassify each of the superpixels as empty or other; and
identify regions of the image of the plurality of organized objects, including empty shelf space, based on the reclassified superpixels.

14. The computer program product of claim 13, wherein the computer readable program further causes the computer to identify indexed objects in the image and label superpixels with an object identifier.

15. The computer program product of claim 13, wherein the computer readable program further causes the computer to generate region hypotheses using the information and observations.

16. The computer program product of claim 15, wherein the computer readable program further causes the computer to classify regions of the image using the region hypotheses.

17. The computer program product of claim 13, wherein the regions include one or more from the group of: known objects, empty shelf space, shelf features, and labels.

* * * * *